(12) United States Patent
House et al.

(10) Patent No.: US 10,401,843 B2
(45) Date of Patent: Sep. 3, 2019

(54) CONTROL SYSTEM WITH COMBINED EXTREMUM-SEEKING CONTROL AND FEEDFORWARD CONTROL

(71) Applicant: Johnson Controls Technology Company, Plymouth, MI (US)

(72) Inventors: John M. House, Saint-Leonard (CA); Timothy I. Salsbury, Mequon, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 166 days.

(21) Appl. No.: 15/461,222

(22) Filed: Mar. 16, 2017

(65) Prior Publication Data

US 2018/0267515 A1 Sep. 20, 2018

(51) Int. Cl.
| | |
|---|---|
| G05B 19/418 | (2006.01) |
| G05B 13/02 | (2006.01) |
| F24F 11/63 | (2018.01) |
| F24F 110/10 | (2018.01) |
| F24F 11/64 | (2018.01) |
| F24F 11/46 | (2018.01) |

(52) U.S. Cl.
CPC .......... G05B 19/4188 (2013.01); F24F 11/63 (2018.01); G05B 13/022 (2013.01); F24F 11/46 (2018.01); F24F 11/64 (2018.01); F24F 2110/10 (2018.01); G05B 2219/43112 (2013.01)

(58) Field of Classification Search
CPC .............. G05B 19/4188; G05B 13/022; G05B 2219/43112; F24F 11/63; F24F 11/64; F24F 11/46; F24F 2110/10

USPC ............................................. 700/38
See application file for complete search history.

(56) References Cited

U.S. PATENT DOCUMENTS

| | | | |
|---|---|---|---|
| 7,827,813 B2 | 11/2010 | Seem | |
| 8,027,742 B2 | 9/2011 | Seem et al. | |
| (Continued) | | | |

FOREIGN PATENT DOCUMENTS

| | | |
|---|---|---|
| EP | 0 152 871 A2 | 8/1985 |
| EP | 2 172 378 A1 | 4/2010 |

OTHER PUBLICATIONS

Sava Marinkov, Extremum Seeking Control with Data-Based Disturbance Feedforward, Jun. 6, 2014, American Control Conference, pp. 3627-3632 (Year: 2014).*

(Continued)

*Primary Examiner* — Darrin D Dunn
*Assistant Examiner* — Christopher W Carter
(74) *Attorney, Agent, or Firm* — Foley & Lardner LLP

(57) ABSTRACT

A control system is configured to operate a plant to achieve an optimal value for a performance variable of the plant. The system comprise a feedforward controller configured to receive a measurable disturbance to the plant and generate a feedforward contribution to a control input to the plant using the measurable disturbance. The system also comprises an extremum-seeking controller configured to receive the performance variable from the plant and generate an extremum-seeking contribution to the control input to drive the performance variable to the optimal value. The system further comprises a control input element configured to generate the control input by combining the extremum-seeking contribution and the feedforward contribution and provide the control input to the plant.

20 Claims, 14 Drawing Sheets

(56) References Cited

U.S. PATENT DOCUMENTS

| | | |
|---|---|---|
| 8,200,344 B2 | 6/2012 | Li et al. |
| 8,200,345 B2 | 6/2012 | Li et al. |
| 8,473,080 B2 | 6/2013 | Seem et al. |
| 2013/0190900 A1* | 7/2013 | Seem .................. F25B 49/027 700/47 |
| 2016/0098020 A1 | 4/2016 | Salsbury et al. |
| 2016/0132027 A1 | 5/2016 | Li et al. |

OTHER PUBLICATIONS

Daniel Burns, Extremum Seeking Control for Energy Optimization of Vapor Compression Systems, Jul. 19, 2012, Purdue e-Pubs, pp. 1-7 (Year: 2012).*

S. J. Liu, Stochastic Averaging and Stochastic Extremum Seeking, 2012, Springer-Verlag London, Edition XII, Chapter 2, pp. 11-20 (Year: 2012).*

Vipin Tyagi, An Extermum Seeking Algorithm for Determining the Set Point Temperature for Condensed Water in a Cooling Tower, Jun. 16, 2006, American Control Conference IEEE, pp. 1127-1131 (Year: 2006).*

Extended European Search Report for EP Application No. 18162389.3 dated Jul. 27, 2018. 8 pages.

Marinkov et al., Extremum Seeking Control With Adaptive Disturbance Feedforward, Aug. 2014, 6 pages.

* cited by examiner

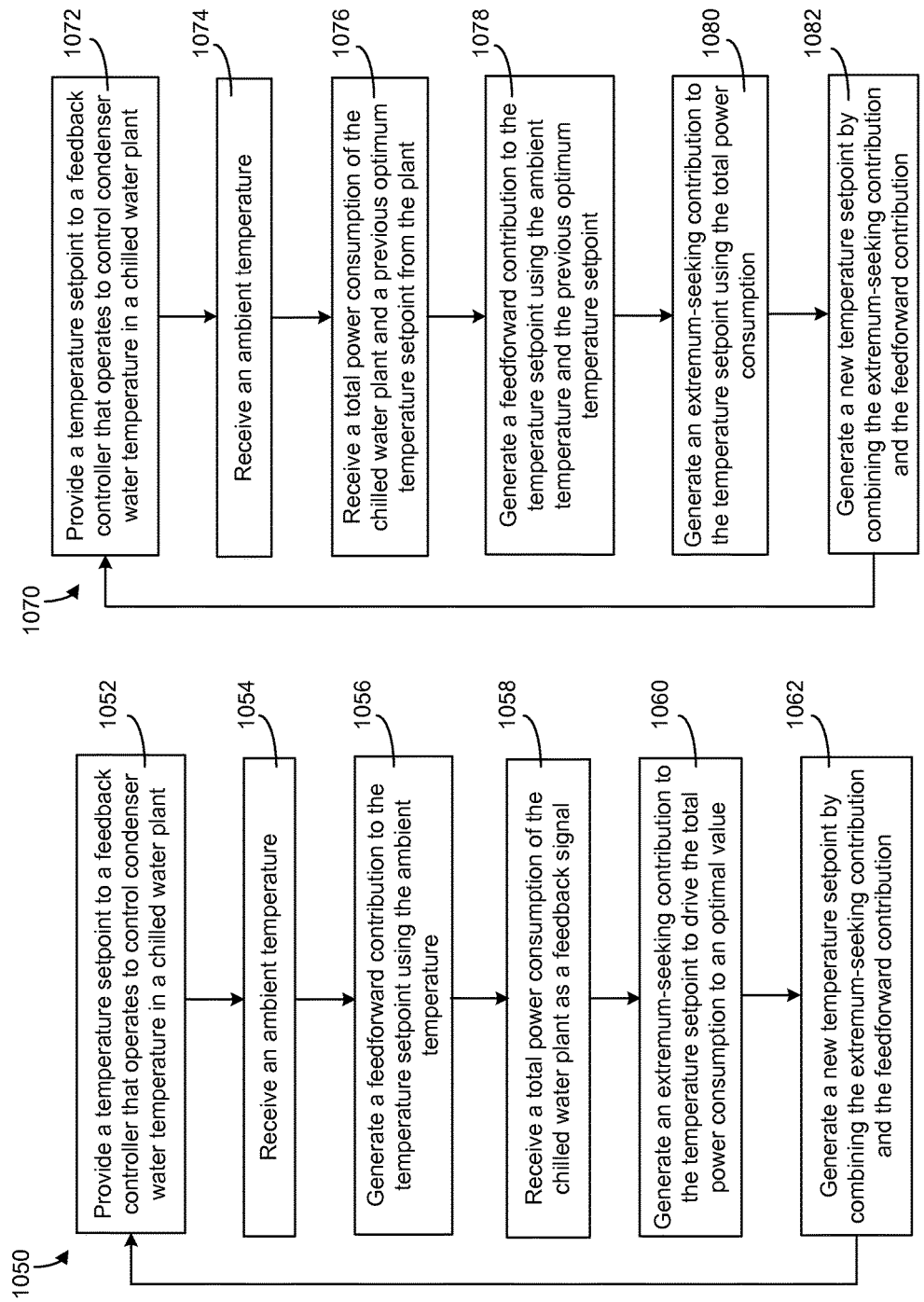

CONTROL SYSTEM WITH COMBINED EXTREMUM-SEEKING CONTROL AND FEEDFORWARD CONTROL

BACKGROUND

The present disclosure relates generally to a control system combining extremum-seeking control (ESC) with feedforward control. ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. Optimization of system performance can be obtained by driving the gradient towards zero by using a negative feedback loop in the closed-loop system. ESC is a non-model based control strategy, meaning that a model for the controlled system is not necessary for ESC to optimize the system.

Applications of ESC may be limited by the speed of convergence to the optimal system output y, which is not necessarily a problem for systems with a stationary optimum. However, for systems like a heating, ventilating, and air-conditioning (HVAC) system, the optimal system output y generally changes as driving conditions (e.g., ambient temperature, load on the system) change. If the speed of convergence to the optimal system output y is slower than the dynamic response of the process being optimized, it could be problematic to track the optimum. It is desirable to have a controlling system and method that converges to the optimal system performance faster than the rate of the driving conditions changes influencing the optimum.

SUMMARY

One implementation of the present disclosure is a control system configured to operate a plant to achieve an optimal value for a performance variable of the plant. The control system includes a feedforward controller, an extremum-seeking controller, and a control input element. The feedforward controller is configured to receive a measurable disturbance to the plant and generate a feedforward contribution to a control input to the plant using the measurable disturbance. The extremum-seeking controller is configured to receive the performance variable from the plant and generate an extremum-seeking contribution to the control input to drive the performance variable to the optimal value. The control input element is configured to generate the control input by combining the extremum-seeking contribution and the feedforward contribution and provide the control input to the plant.

In some embodiments, the feedforward controller is configured to generate the feedforward contribution based on a lookup table that maps the measurable disturbance to the control input.

In some embodiments, the feedforward controller is configured to generate the feedforward contribution based on a feedforward model that maps the measurable disturbance to the control input.

In some embodiments, the feedforward model is established based on data collected during tests and/or actual applications.

In some embodiments, the feedforward controller is further configured to receive a previous optimal control input that corresponds to a previous optimal value for the performance variable under a previous measurable disturbance, and correct the feedforward contribution using the previous optimal control input.

In some embodiments, the extremum-seeking controller is further configured to perturb the control input with a periodic signal, monitor the performance variable from the perturbed control input, estimate a gradient of the performance variable with respect to the control input, and modulate the extremum-seeking contribution to drive the estimated gradient to zero.

In some embodiments, the extremum-seeking controller is further configured to perturb the control input with a stochastic excitation signal, monitor the performance variable from the perturbed control input, estimate a gradient of the performance variable with respect to the control input, and modulate the extremum-seeking contribution to drive the estimated gradient to zero.

In some embodiments, the stochastic excitation signal is a non-periodic signal comprising at least one of a random walk signal, a non-deterministic signal, and a non-repeating signal.

Another implementation of the present disclosure is a control system configured to operate equipment of a chilled water plant to achieve an optimal value for a total power consumption of the chilled water plant. The equipment includes at least one of a chiller compressor, a condenser water pump, and a cooling tower fan. The control system comprises a feedforward controller, an extremum-seeking controller, and a control input element. The feedforward controller is configured to receive an ambient temperature and generate a feedforward contribution to a temperature setpoint for condenser water temperature in the chilled water plant using the ambient temperature. The extremum-seeking controller is configured to receive the total power consumption from the plant and generate an extremum-seeking contribution to the temperature setpoint to drive the total power consumption to the optimal value. The control input element is configured to generate the temperature setpoint by combining the extremum-seeking contribution and the feedforward contribution and provide the temperature setpoint to the chilled water plant.

In some embodiments, the feedforward controller is configured to generate the feedforward contribution based on a lookup table that maps the ambient temperature to the temperature setpoint.

In some embodiments, the feedforward controller is configured to generate the feedforward contribution based on a feedforward model that maps the ambient temperature to the temperature setpoint.

In some embodiments, the feedforward model is established based on data collected during tests and/or actual applications.

In some embodiments, the feedforward controller is further configured to receive a previous optimal temperature setpoint that corresponds to a previous optimal value for the total power consumption under a previous ambient temperature, and correct the feedforward contribution using the previous optimal temperature setpoint.

In some embodiments, the extremum-seeking controller is further configured to perturb the temperature setpoint with a stochastic signal, monitor the total power consumption from the perturbed temperature setpoint, estimate a gradient of the total power consumption with respect to the temperature setpoint, and modulate the extremum-seeking contribution to drive the estimated gradient to zero.

Another implementation of the present disclosure is a control system configured to operate equipment of a chilled water plant to achieve an optimal value for a total power consumption of the chilled water plant. The equipment includes at least one of a chiller compressor, a condenser water pump, and a cooling tower fan. The control system includes a feedforward controller, an extremum-seeking controller, and a control input element. The feedforward controller is configured to receive a load on the chilled water plant and generate a feedforward contribution to a fan speed for the cooling tower fan using the load. The extremum-seeking controller is configured to receive the total power consumption from the plant and generate an extremum-seeking contribution to the fan speed to drive the total power consumption to the optimal value. The control input element is configured to generate the fan speed by combining the extremum-seeking contribution and the feedforward contribution and provide the fan speed to the chilled water plant.

In some embodiments, the feedforward controller is configured to generate the feedforward contribution based on a lookup table that maps the load to the fan speed.

In some embodiments, the feedforward controller is configured to generate the feedforward contribution based on a feedforward model that maps the load to the fan speed.

In some embodiments, the feedforward model is established based on data collected during tests and/or actual applications.

In some embodiments, the feedforward controller is further configured to receive a previous optimal fan speed that corresponds to a previous optimal value for the total power consumption under a previous load, and correct the feedforward contribution using the previous optimal fan speed.

In some embodiments, the extremum-seeking controller is further configured to perturb the fan speed with a stochastic signal, monitor the total power consumption from the perturbed fan speed, estimate a gradient of the total power consumption with respect to the fan speed, and modulate the extremum-seeking contribution to drive the estimated gradient to zero.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 10B is a flow diagram illustrating a control method combining ESC and feedforward control used in the chilled water plant of FIG. 10A, according to some embodiments.

FIG. 10C is a flow diagram illustrating another control method combining ESC and feedforward control used in the chilled water plant of FIG. 10A, according to some embodiments.

DETAILED DESCRIPTION

Overview

Figure 1:
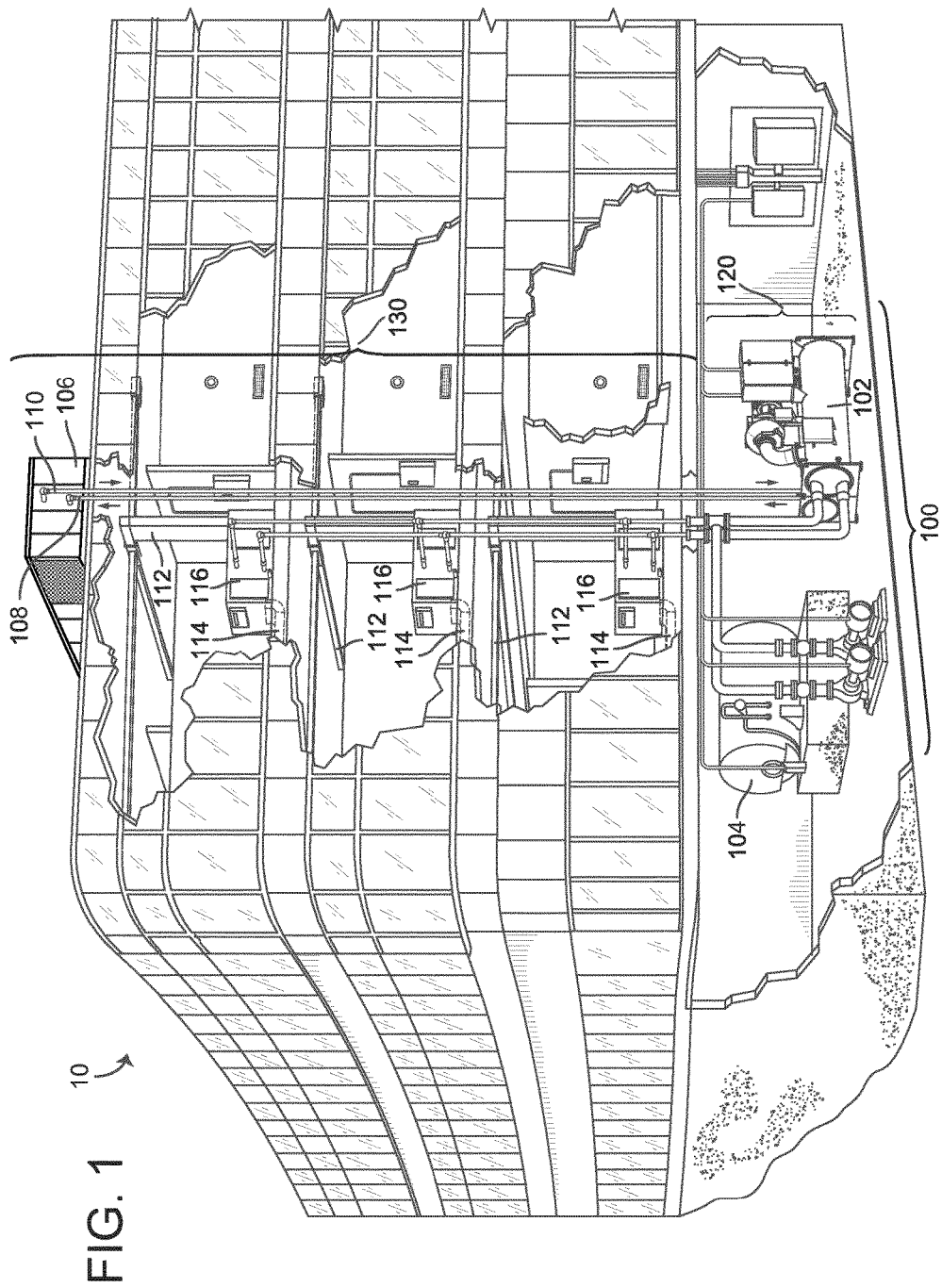
FIG. 1 is a drawing of a building having a heating, ventilating, and air-conditioning (HVAC) system in which a control system combining extremum-seeking control (ESC) and feedforward control can be implemented, according to some embodiments.

Referring generally to the FIGURES, various systems and methods combining extremum-seeking control (ESC) and feedforward control are shown, according to some embodiments. In general, ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. Various implementations of ESC are described in detail in U.S. Pat. Nos. 8,473,080, 7,827,813, 8,027,742, 8,200,345, 8,200,344, U.S. patent application Ser. No. 14/495,773, U.S. patent application Ser. No. 14/538,700, U.S. patent application Ser. No. 14/975,527, U.S. patent application Ser. No. 14/961,747, and U.S. patent application Ser. No. 15/080,435. Each of these patents and patent applications is incorporated by reference herein.

Applications of ESC may be limited by the speed of convergence to the optimal system output y. For example, for a heating, ventilating, and air-conditioning (HVAC) system, the optimal system output y (e.g., total power consumption) generally changes as driving conditions (e.g., ambient temperature, load on the system) change. The rate of convergence to the optimal system output y is desirable to be faster than the rate of the driving conditions changes influencing the optimum. The feedforward controller uses, for example, a feedforward model or lookup table, to map the driving conditions to the system input u. Using the feedforward model or lookup table, the feedforward controller can quickly put the system input u close to a value that corresponds to the optimal system output y. The extremum-seeking controller can provide a correction to the output from the feedforward controller (which is sensitive to modeling and sensor error) and drive the system output y to the optimum for given driving conditions. In further embodiments, the feedforward model or lookup table may be updated by previous values of the system input u that correspond to the optimal system output y for given driving conditions. The feedforward controller can uses the updated feedforward model or lookup table for subsequent mapping.

In some embodiments, the extremum-seeking controller uses a periodic dither signal v to perturb the control input u. In other embodiments, the extremum-seeking controller uses a stochastic excitation signal q to perturb a control input u. In further embodiments, the extremum-seeking controller estimates a normalized correlation coefficient ρ relating the performance variable y to the control input u. The correlation coefficient ρ can be related to the performance gradient $$\frac{dy}{du}$$

$$\left(e.g., \text{ proportional to } \frac{dy}{du}\right)$$

but scaled based on the range of the performance variable y. For example, the correlation coefficient ρ can be a normalized measure of the performance gradient $$\frac{dy}{du}$$

scaled to the range −1≤ρ≤1. The correlation coefficient ρ can be used by the extremum-seeking controller instead of the performance gradient $$\frac{dy}{du}.$$

Building and HVAC System

Figure 2:
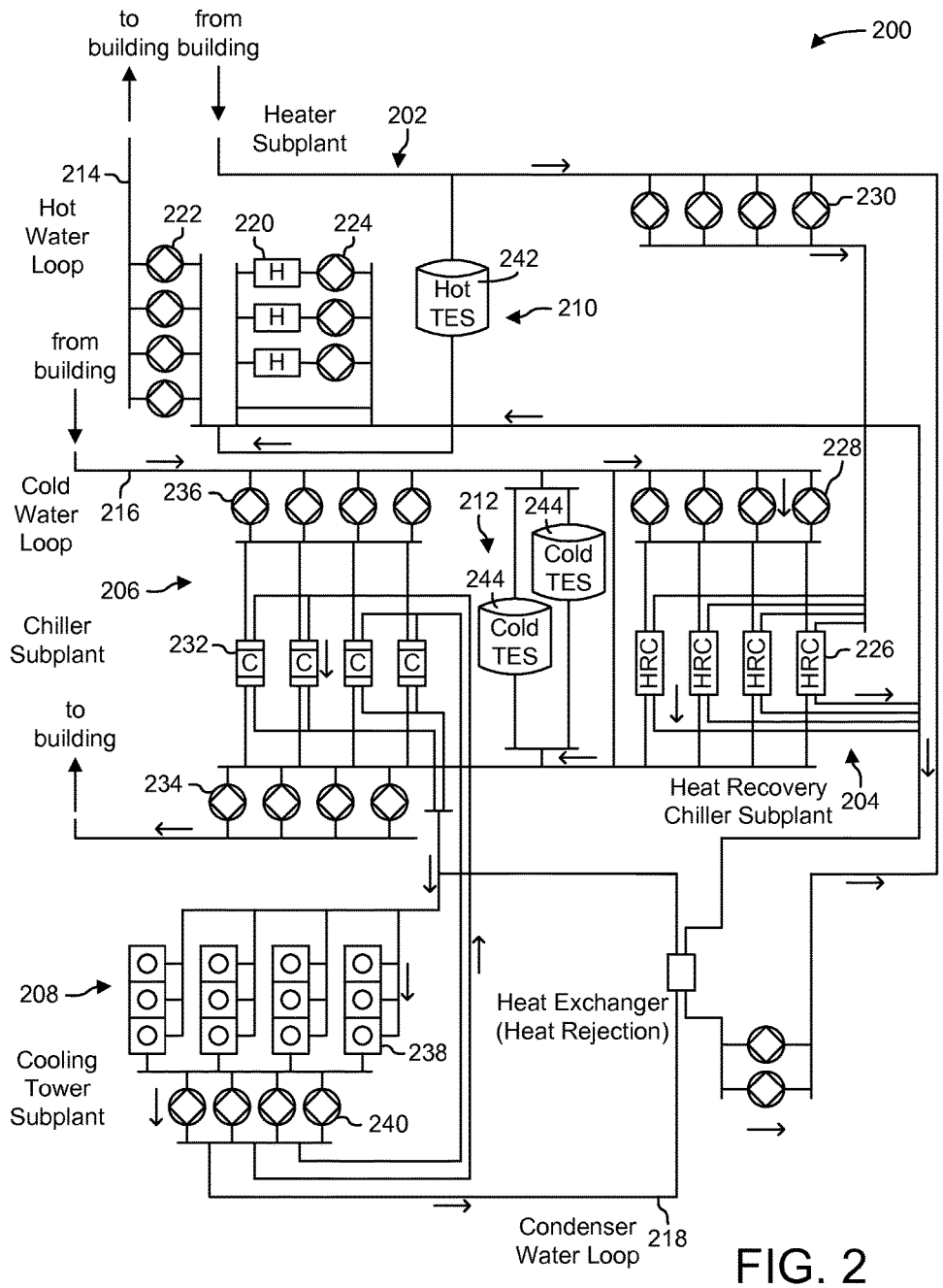
FIG. 2 is a schematic diagram of a waterside system which can be used in the HVAC system of FIG. 1, according to some embodiments.
Figure 3:
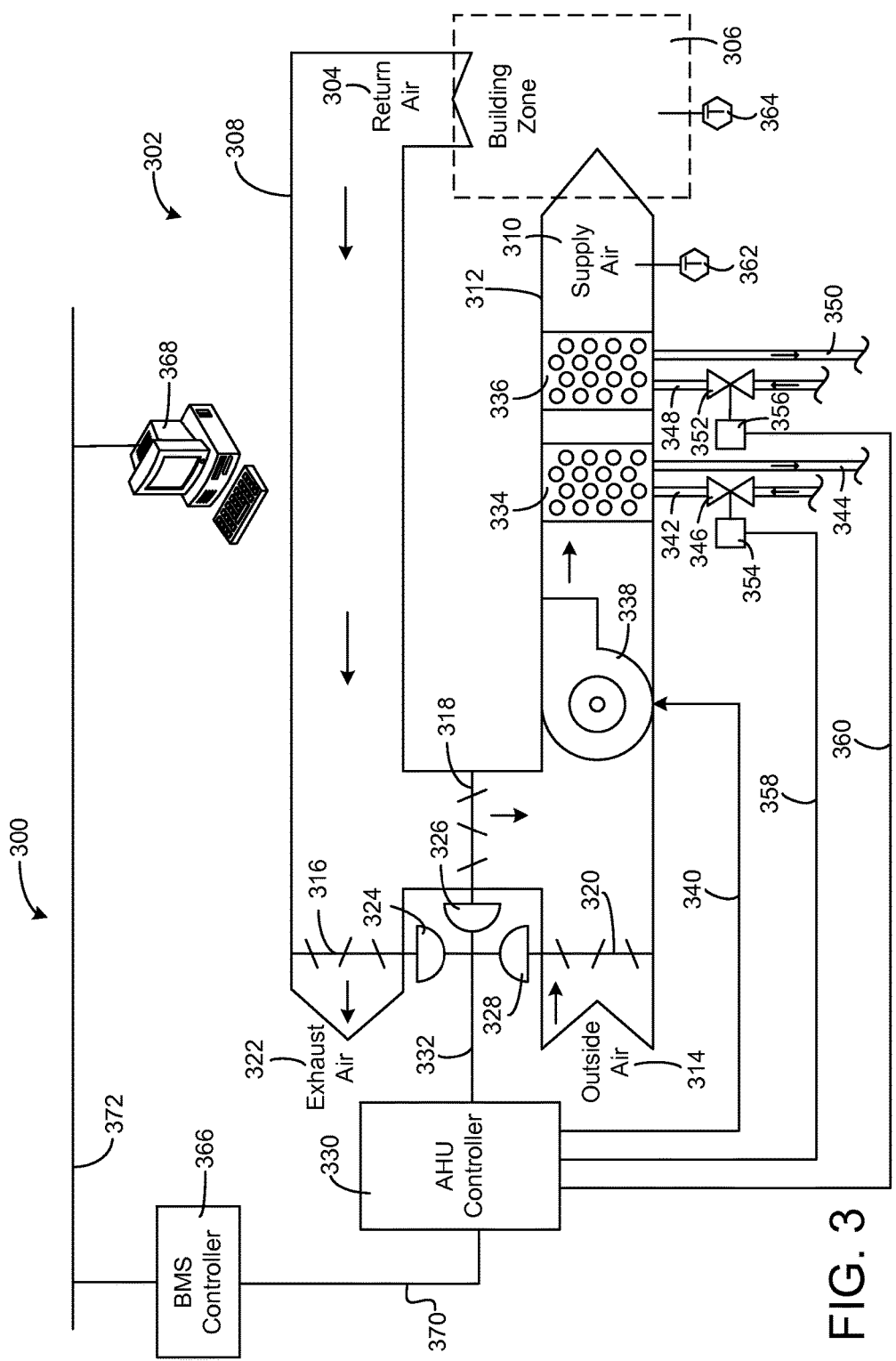
FIG. 3 is a schematic diagram of an airside system which can be used in the HVAC system of FIG. 1, according to some embodiments.

Referring now to FIGS. 1-3, a building 10 having a HVAC system 20 in which a control system combining ESC control and feedforward control can be implemented is shown, according to some embodiments. Although the control systems and methods of the present disclosure are described primarily in the context of a building HVAC system, it should be understood that the technique is generally applicable to any type of control system that optimizes or regulates a variable of interest. For example, the control systems and methods of the present disclosure can be used to optimize an amount of energy produced by various types of energy producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, refrigeration systems, etc.).

In various implementations, combined ESC and feedforward control can be used in any type of controller that functions to achieve a setpoint for a variable of interest (e.g., by minimizing a difference between a measured or calculated input and a setpoint) and/or optimize a variable of interest (e.g., maximize or minimize an output variable). It is contemplated that ESC can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.). All such implementations should be considered within the scope of the present disclosure.

Referring now to FIGS. 1-3, several HVAC systems in which the systems and methods of the present disclosure can be implemented are shown, according to some embodiments. In brief overview, FIG. 1 shows a building 10 equipped with a HVAC system 100. FIG. 2 is a schematic diagram of a waterside system which can be used in the HVAC system of FIG. 1. FIG. 3 is a schematic diagram of an airside system which can be used in the HVAC system of FIG. 1.

Building 10 and HVAC System 100

Referring particularly to FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Control System Combining Extremum-Seeking Control (ESC) and Feedforward Control

Figure 4:
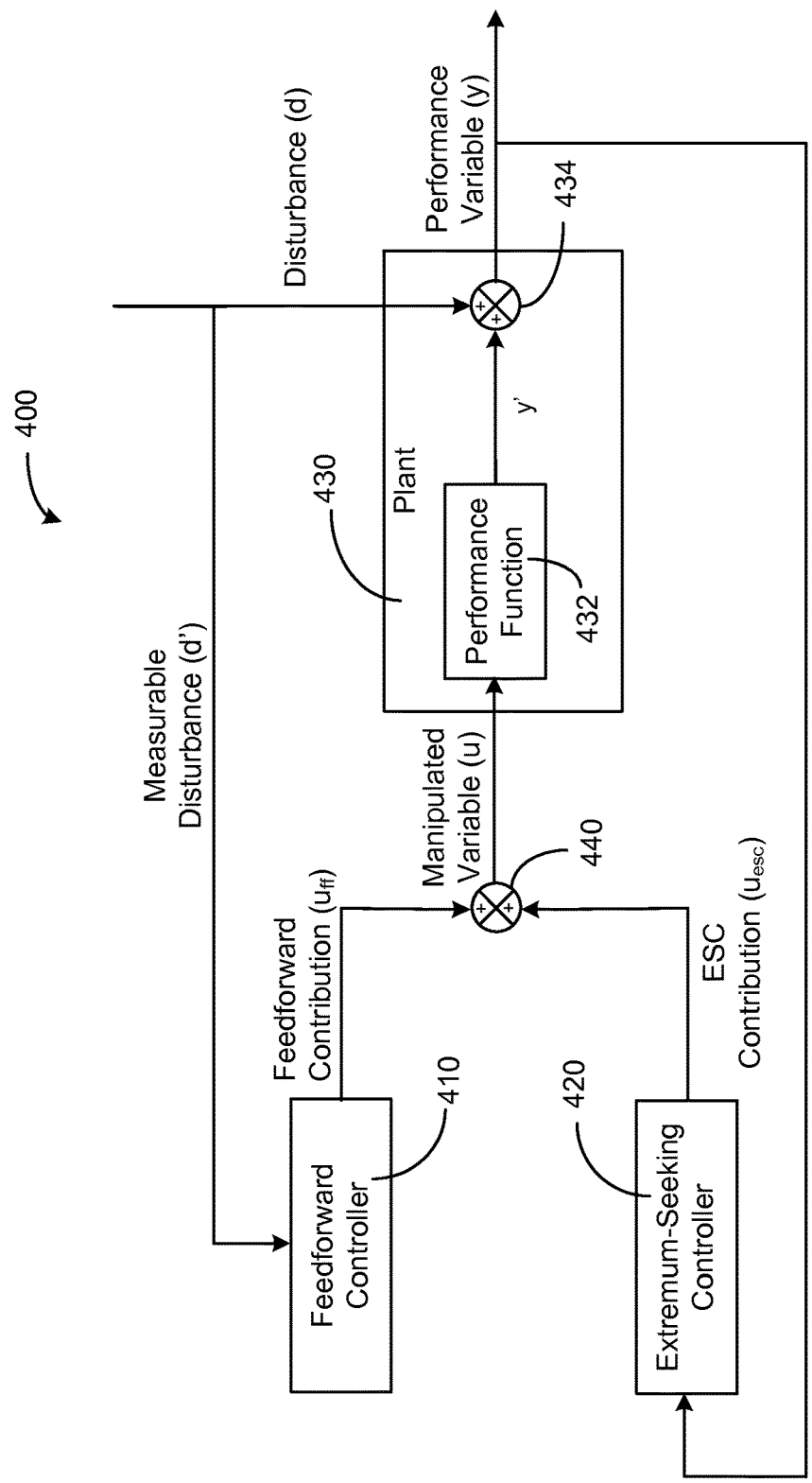
FIG. 4 is a block diagram of a control system combining ESC and feedforward control, according to some embodiments.

Referring now to FIG. 4, a block diagram of a control system 400 combining ESC and feedforward control is shown, according to some embodiments. Control system 400 is shown to include a feedforward controller 410, an extremum-seeking controller 420, and a plant 430. A plant in control theory is the combination of a process and one or more mechanically-controlled outputs. For example, plant 430 can be an air handling unit configured to control temperature within a building space via one or more mechanically-controlled actuators and/or dampers. In various embodiments, plant 430 can include a chiller operation process, a damper adjustment process, a mechanical cooling process, a ventilation process, a refrigeration process, or any other process in which an input variable to plant 430 (i.e., manipulated variable u) is adjusted to affect an output from plant 430 (i.e., performance variable y).

Feedforward controller 410 uses feedforward control logic to quickly put the manipulated variable u close to a value that corresponds to the optimal performance variable y. The value of the optimal performance variable y may change as disturbances d occur. The disturbances d includes a portion that is measurable (i.e., measurable disturbance d') and a portion that is not measurable. The measurable disturbance d' may include, for example, ambient temperature that can be measured by a thermometer, a load on the system that can be measured by a load sensor, etc. The non-measurable portion of disturbance d may include, for example, process noise, system noise, etc. Feedforward controller 410 may use a feedforward logic to map the measurable disturbance d' onto a feedforward contribution $u_{ff}$ to the manipulated variable u. The value of the feedforward contribution $u_{ff}$ is close to the value of u that corresponds to the optimal performance variable y.

Feedforward controller 410 uses, for example, a feedforward model or lookup table, to map the measurable disturbance d' to the manipulated variable u. In some embodiments, a feedforward model is used. The feedforward model may include a correlation between the measurable disturbance d' and the manipulated variable u. In some embodiments, the correlation may be established based on data collected during various tests and/or actual applications (i.e., past data). For example, the measurable disturbance d' may be read from sensors (e.g., ambient temperature measured by a thermometer, load on the system that can be measured by a load sensor). The sensors can be or not be a part of the system being optimized. The manipulated variable u may be read from plant 430, which stores the values of u that correspond to the optimal performance variable y for any given measurable disturbance d'. A mathematical fitting may be used to establish the correlation (e.g., equations) based on the data. In other embodiments, the correlation between the measurable disturbance d' and the manipulated variable u may be derived from theoretical models and/or mathematic computation.

In other embodiments, a lookup table may be used to map the measurable disturbance d' onto the manipulated variable u. The lookup table may be constructed based on data collected during various tests and/or actual applications (i.e., past data) or theoretical models and/or mathematic computation. In operation, when the measurable disturbance d' is received from sensors, feedforward controller 410 may find the corresponding manipulated variable u from the lookup table or use interpolation to calculate the manipulated variable u and output the value of u as the feedforward contribution $u_{ff}$.

Extremum-seeking controller 420 uses extremum-seeking control logic to modulate the manipulated variable u. Extremum-seeking controller 420 provides a correction to the output $u_{ff}$ from feedforward controller 410. Feedforward controller 410 is sensitive to modeling and sensor errors. Thus, there might be a small error between the output $u_{ff}$ from feedforward controller 410 and the value of manipulated variable u corresponding to the optimal performance variable y. Extremum-seeking controller 420 can drive the system output y to the optimum by modulating the manipulated variable u.

In some embodiments, extremum-seeking controller 420 may generate an ESC contribution $u_{esc}$ which is added to the feedforward contribution $u_{ff}$ output from feedforward controller 410. The combination of the ESC contribution $u_{esc}$ and the feedforward contribution $u_{ff}$ is used as the manipulated variable u provided to plant 430 (e.g., $u=u_{ff}+u_{esc}$). The ESC contribution $u_{esc}$ includes an AC component and a DC component. In some embodiments, extremum-seeking controller uses a periodic (e.g., sinusoidal) perturbation signal or dither signal as the AC component to perturb the value of manipulated variable u in order to extract a performance gradient p. In other embodiments, extremum-seeking controller 420 uses a stochastic excitation signal q as the AC component to perturb the value of manipulated variable u in order to extract a performance gradient p. The performance gradient p represents the gradient or slope of the performance variable y with respect to the manipulated variable u. Extremum-seeking controller 420 optimizes the performance variable y by finding a DC component of the ESC contribution $u_{esc}$ that drives the performance gradient p to zero.

Extremum-seeking controller 420 recursively updates the DC component of the ESC contribution $u_{esc}$ based on a measurement or other indication of the performance variable y received from plant 430 as a feedback. Measurements from plant 430 can include, but are not limited to, information received from sensors about the state of plant 430 or control signals sent to other devices in the system. In other embodiments, the performance variable y is a measured or calculated amount of power consumption, a fan speed, a damper position, a temperature, or any other variable that can be measured or calculated by plant 430. Performance variable y can be the variable that extremum-seeking controller 420 seeks to optimize via an extremum-seeking control technique. Performance variable y can be output by plant 430 or observed at plant 430 (e.g., via a sensor) and provided to extremum-seeking controller 420.

Manipulated variable element 440 combines the feedforward contribution $u_{ff}$ and the ESC contribution $u_{esc}$ to produce the manipulated variable u (e.g., $u=u_{ff}+u_{esc}$). The manipulated variable u is provided to a performance function 432 of plant 430, which generates a signal y' as a function of the manipulated variable u (e.g., y'=f(u)). The signal y' can be considered the performance variable responsive to the manipulated variable u without taking the disturbances d into account. The signal y' may be modified, at performance variable element 434, by the disturbances d to produce performance variable y (e.g., y=y'+d). It should be understand that the operator "+" used herein means combination, which can be any suitable form of combination, not limited to the addition operation. The performance variable y is provided as an output from plant 430 and received at extremum-seeking controller 420. Extremum-seeking controller 420 may seek to find values for $u_{esc}$ that optimize the signal y' and/or the performance variable y.

Figure 5:
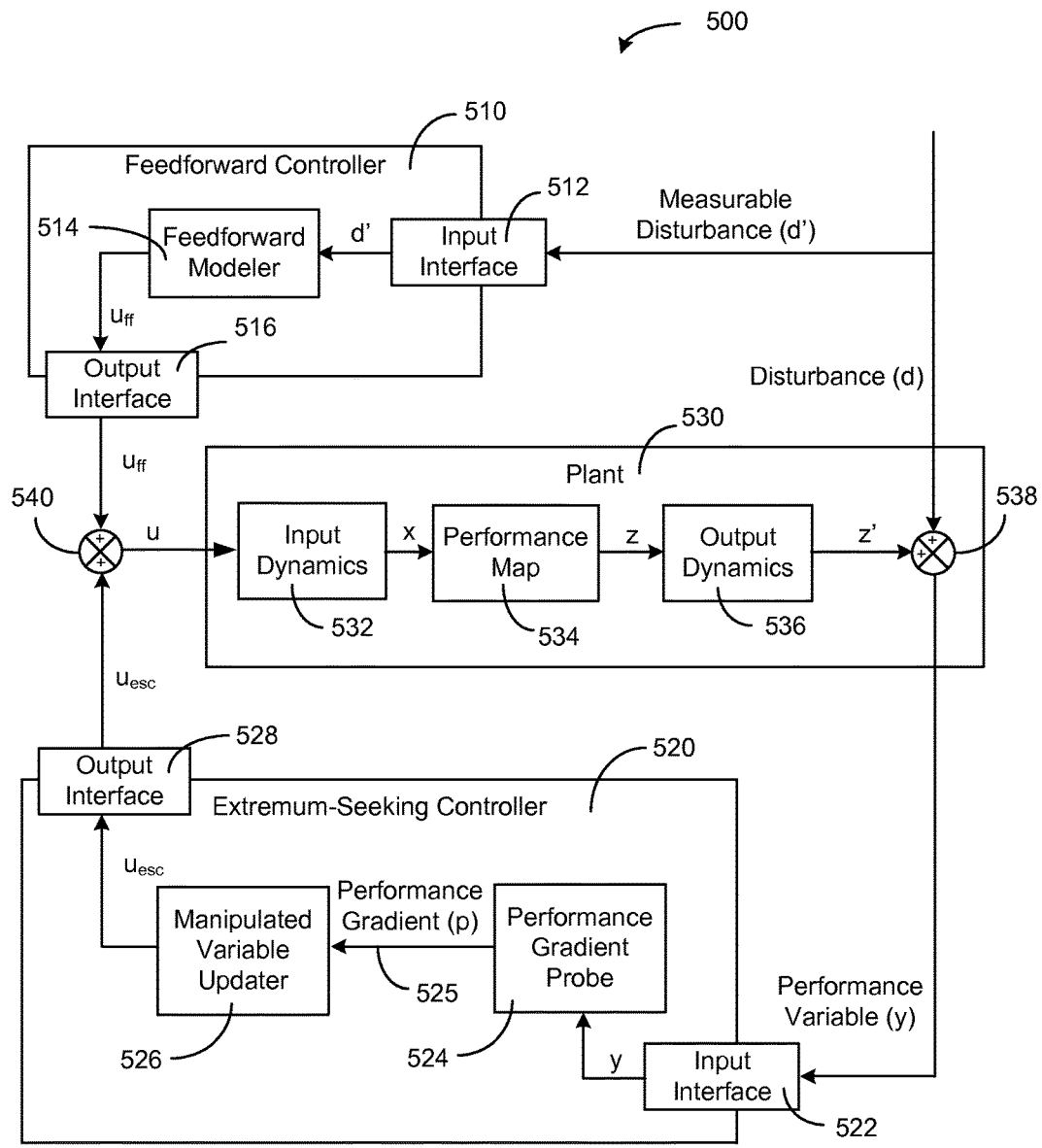
FIG. 5 is a block diagram of another control system combining ESC and feedforward control, according to some embodiments.

Referring now to FIG. 5, a block diagram of another control system 500 combining ESC and feedforward control is shown, according to some embodiments. Control system 500 is shown to include a feedforward controller 510, an extremum-seeking controller 520, and a plant 530.

Plant 530 can be the same as plant 430 or similar to plant 430, as described with reference to FIG. 4. For example, plant 530 can be a combination of a process and one or more mechanically-controlled outputs. In some embodiments, plant 530 is an air handling unit configured to control temperature within a building space via one or more mechanically-controlled actuators and/or dampers. In other embodiments, plant 530 can include a chiller operation process, a damper adjustment process, a mechanical cooling process, a ventilation process, or any other process that generates an output based on one or more control inputs.

Plant 530 can be represented mathematically as a combination of input dynamics 532, performance map 534, output dynamics 536, performance variable element 538, and disturbances d. In some embodiments, input dynamics 532 are linear time-invariant (LTI) input dynamics and output dynamics 536 are LTI output dynamics. Performance map 534 can be a static nonlinear performance map. Disturbances d may include a portion that is measurable (i.e., measurable disturbance d') and a portion that is not measurable. The measurable disturbance d' may include, for example, ambient temperature that can be measured by a thermometer, a load on the system that can be measured by a load sensor, etc. The non-measurable portion of disturbance d may include, for example, process noise, system noise, etc.

Plant 530 receives a control input u (e.g., a control signal, a manipulated variable, etc.) via manipulated variable element 540. Input dynamics 532 may use the control input u to generate a function signal x based on the control input u (e.g., x=f(u)). Function signal x may be passed to performance map 534 which generates an output signal z as a function of the function signal (i.e., z=g(x)). The output signal z may be passed through output dynamics 536 to produce signal z'. The signal z' may be modified, at performance variable element 538, by the disturbances d to produce performance variable y (e.g., y=z'+d). It should be understand that the operator "+" used herein means combination, which can be any suitable form of combination, not limited to the addition operation. The performance variable y is provided as an output from plant 530 and received at extremum-seeking controller 520. Extremum-seeking controller 520 may seek to find values for x and/or u that optimize the output z of performance map 534 and/or the performance variable y.

Feedforward controller 510 can be used as feedforward controller 410 of FIG. 4. Feedforward controller 510 is shown to include an input interface 512, a feedforward modeler 514, and an output interface 516. Feedforward controller 510 may determine the feedforward contribution $u_{ff}$ to the manipulated variable u based on the measurable disturbance d' received from sensors via input interface 512. The sensors can be or not be a part of the system being optimized. The measurable disturbance d' may include, for example, ambient temperature that can be measured by a thermometer, a load on the system that can be measured by a load sensor, etc.

Input interface 512 provides the measurable disturbance d' to feedforward modeler 514 to determine the feedforward contribution $u_{ff}$ to the manipulated variable u. Feedforward modeler 514 maps the measurable disturbance d' onto the feedforward contribution $u_{ff}$. In some embodiments, the feedforward modeler 514 may use a correlation between the measurable disturbance d' and the manipulated variable u. In some embodiments, the correlation may be established based on data collected during various tests on and/or actual applications of the system, as discussed above with reference to FIG. 4. In other embodiments, the correlation may be derived from theoretical models and/or mathematic computation. In some embodiments, feedforward modeler 514 uses a lookup table to map the measurable disturbance d' onto the feedforward contribution $u_{ff}$. In operation, when the measurable disturbance d' is received from sensors, feedforward modeler 514 may find the corresponding feedforward contribution $u_{ff}$ from the lookup table or use interpolation to calculate the feedforward contribution $u_{ff}$. The value of the feedforward contribution $u_{ff}$ may be close to the value of the manipulated variable u that corresponds to the optimal performance variable y. Feedforward modeler 514 provides the feedforward contribution $u_{ff}$ to plant 530 via output interface 516.

Extremum-seeking controller 520 is shown to include an input interface 522, a performance gradient probe 524, a manipulated variable updater 526, and an output interface 528. Extremum-seeking controller 520 may provide a correction to the output $u_{ff}$ from feedforward controller 510. In particular, extremum-seeking controller 520 generates an ESC contribution $u_{esc}$ which is added to the feedforward contribution $u_{ff}$ output from feedforward controller 510. The combination of the ESC contribution $u_{esc}$ and the feedforward contribution $u_{ff}$ is used as the manipulated variable u provided to plant 530 (e.g., $u=u_{ff}+u_{esc}$). The ESC contribution $u_{esc}$ includes an AC component and a DC component.

The DC component of the ESC contribution $u_{esc}$ is determined based on a measurement or other indication of the performance variable y received as feedback from plant 530 via input interface 522. Measurements from plant 530 can include, but are not limited to, information received from sensors about the state of plant 530 or control signals sent to other devices in the system. In some embodiments, the performance variable y is a measured or calculated amount of power consumption, a fan speed, a damper position, a temperature, or any other variable that can be measured or calculated by plant 530. Performance variable y can be the variable that extremum-seeking controller 520 seeks to optimize via an extremum-seeking control technique. Performance variable y can be output by plant 530 or observed at plant 530 (e.g., via a sensor) and provided to extremum-seeking controller at input interface 522.

Input interface 522 provides the performance variable y to performance gradient probe 524 to detect a performance gradient 525. Performance gradient probe 524 generates a perturbation signal or dither signal as the AC component of the ESC contribution $u_{esc}$ in order to extract the performance gradient 525. In some embodiments, performance gradient probe 524 uses a periodic (e.g., sinusoidal) perturbation signal or dither signal as the AC component. In other embodiments, performance gradient probe 524 uses a stochastic excitation signal q as the AC component. The performance gradient 525 indicates a slope of the function y=ƒ(u), where y represents the performance variable received from plant 530 and u represents the manipulated variable provided to plant 530. When performance gradient 525 is zero, the performance variable y has an extremum value (e.g., a maximum or minimum). Therefore, extremum-seeking controller 520 can optimize the value of the performance variable y by driving performance gradient 525 to zero.

Manipulated variable updater 526 updates the DC component of the ESC contribution $u_{esc}$ based upon performance gradient 525 received from performance gradient probe 524. In some embodiments, manipulated variable updater 526 includes an integrator to drive performance gradient 525 to zero. Manipulated variable updater 526 then provides an updated ESC contribution $u_{esc}$ to manipulated variable element 540 via output interface 528.

Manipulated variable element 540 combines the feedforward contribution $u_{ff}$ and the ESC contribution $u_{esc}$ to generate the manipulated variable u (e.g., $u=u_{ff}+u_{esc}$), which is provided to plant 530, for example, to one of dampers 316-320 (FIG. 3) or an actuator affecting dampers 316-320 as a control signal via output interface 528. Plant 530 can use the manipulated variable u as a setpoint to adjust the position of dampers 316-320 and thereby control the relative proportions of outdoor air 314 (FIG. 3) and recirculation air provided to a temperature-controlled space.

Figure 6:
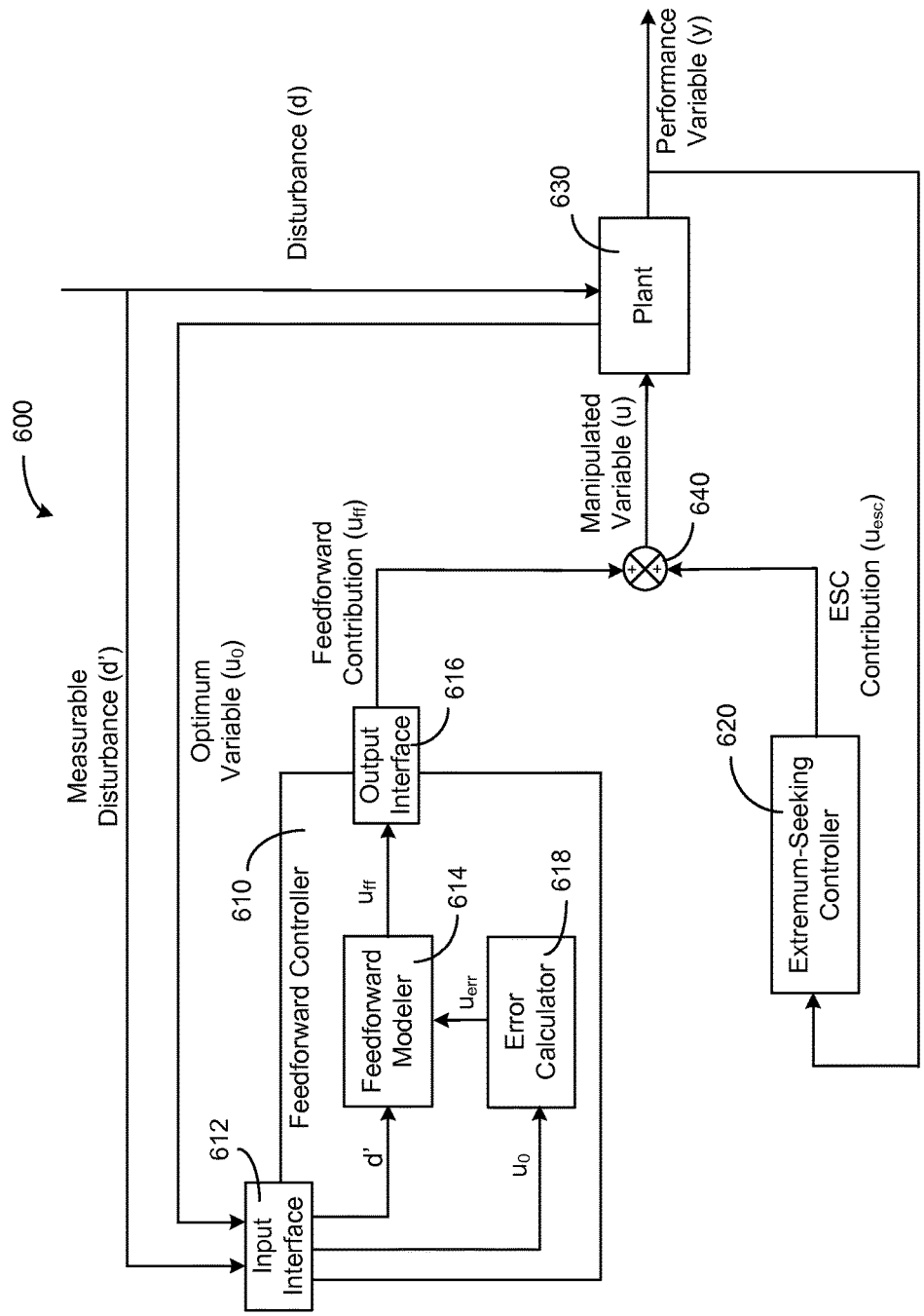
FIG. 6 is a block diagram of a feedforward controller, according to some embodiments.

Referring now to FIG. 6, a block diagram of yet another control system 600 combining ESC and feedforward control is shown, according to some embodiments. Control system 600 is shown to include a feedforward controller 610, an extremum-seeking controller 620, and a plant 630. Plant 630 can be the same as or similar to plant 430 of FIG. 4 or plant 530 of FIG. 5. Extremum-seeking controller 620 can be the same as or similar to extremum-seeking controller 420 of FIG. 4 or extremum-seeking controller 520 of FIG. 5.

Feedforward controller 610 is shown to include an input interface 612, a feedforward modeler 614, an error calculator 618, and an output interface 616. Feedforward controller 610 may use previous data to update a feedforward contribution $u_{ff}$ to the manipulated variable u. The value of the feedforward contribution $u_{ff}$ is close to the value of u that corresponds to the optimal performance variable y.

For a previously given measurable disturbance $d'_0$, control system 600 would ultimately converge to a value $u_0$ of the manipulated value that drives the performance variable y to optimum. In particular, feedforward controller 610 determines a feedforward contribution $u_{ff0}$, and extremum-seeking controller 620 continuously updates ESC contribution $u_{esc0}$ in order to drive the gradient of the performance variable y to zero. The value of $u_{esc0}$ that ultimately drives the gradient of the performance variable y to zero, combined with the feedforward contribution $u_{ff0}$, is the value $u_0$ of the manipulated variable that drives the performance variable y to optimum under the given measurable disturbance $d'_0$. Plant 630 may store the value $u_0$ and provide the value $u_0$ to feedforward controller 610 via input interface 612. Input interface 612 provides the value $u_0$ that drives the performance variable y to optimum under the measurable disturbance $d'_0$ to error calculator 618.

Error calculator 618 calculates the error $u_{err}$ between the value $u_0$ and the feedforward contribution $u_{ff0}$ for the measurable disturbance $d'_0$ (e.g., $u_{err}=u_0-u_{ff0}$), and provides the error $u_{err}$ to feedforward modeler 614. Feedforward modeler 614 may use the error $u_{err}$ to correct the feedforward contribution $u_{ff}$ in the future when another value of measurable disturbance d' is received from sensors via input interface 612. The measurable disturbance d' may include, for example, ambient temperature measured by a thermometer, a load on the system measured by a load sensor, etc. The sensors can be or not be a part of the system being optimized. Feedforward modeler 614 uses a feedforward model or lookup table to map the measurable disturbance d' onto the feedforward contribution $u_{ff}$. In some embodiments, feedforward modeler 614 corrects the feedforward contribution $u_{ff}$ determined from the feedforward table or lookup table with the error $u_{err}$ (i.e., $u_{ff}+u_{err}$). The error $u_{err}$ represents the difference between the value $u_0$ that ultimately drives the performance variable y to optimum and the feedforward contribution $u_{ff0}$ determined from the feedforward table or lookup table for the previous measurable disturbance $d'_0$. Feedforward modeler outputs the corrected feedforward contribution $u_{ff}+u_{err}$ via output interface 616.

In other embodiments, feedforward modeler 614 uses the error $u_{err}$ to update the feedforward model or the lookup table rather than directly correct the feedforward contribution determined from the feedforward model or the lookup table. If the feedforward model of the correlation between the measurable disturbances d' and the feedforward contribution $u_{ff}$ is used, feedforward modeler 614 may update the correlation to reduce the error $u_{err}$ for the previous measurable disturbance $d'_0$. If a lookup table is used, feedforward modeler 614 may correct the data in the lookup data with the error $u_{err}$. Feedforward modeler 614 then uses the updated feedforward model or lookup table to map the measurable disturbance d' onto the feedforward contribution $u_{ff}$ and outputs $u_{ff}$ via output interface 616.

Extremum-seeking controller 620 generates an ESC contribution $u_{esc}$ to modulate the output $u_{ff}$ from feedforward controller 610 in order to drive the performance variable y to optimum. Extremum-seeking controller 620 can be the same as or similar to extremum-seeking controller 420 of FIG. 4 or extremum-seeking controller 520 of FIG. 5. Manipulated variable element 640 combines the feedforward contribution $u_{ff}$ output from feedforward controller 610 and the ESC contribution $u_{esc}$ output from the extremum-seeking controller 620 to produce the manipulated variable u (e.g., $u=u_{ff}+u_{esc}$). The manipulated variable u is provided to plant 630, which generates the performance variable y. The performance variable y is provided as an output from plant 630 and received at extremum-seeking controller 620. Extremum-seeking controller 620 may seek to find values for $u_{esc}$ that optimize the performance variable y.

Extremum-Seeking Control Systems with Periodic Dither Signals

Figure 7:
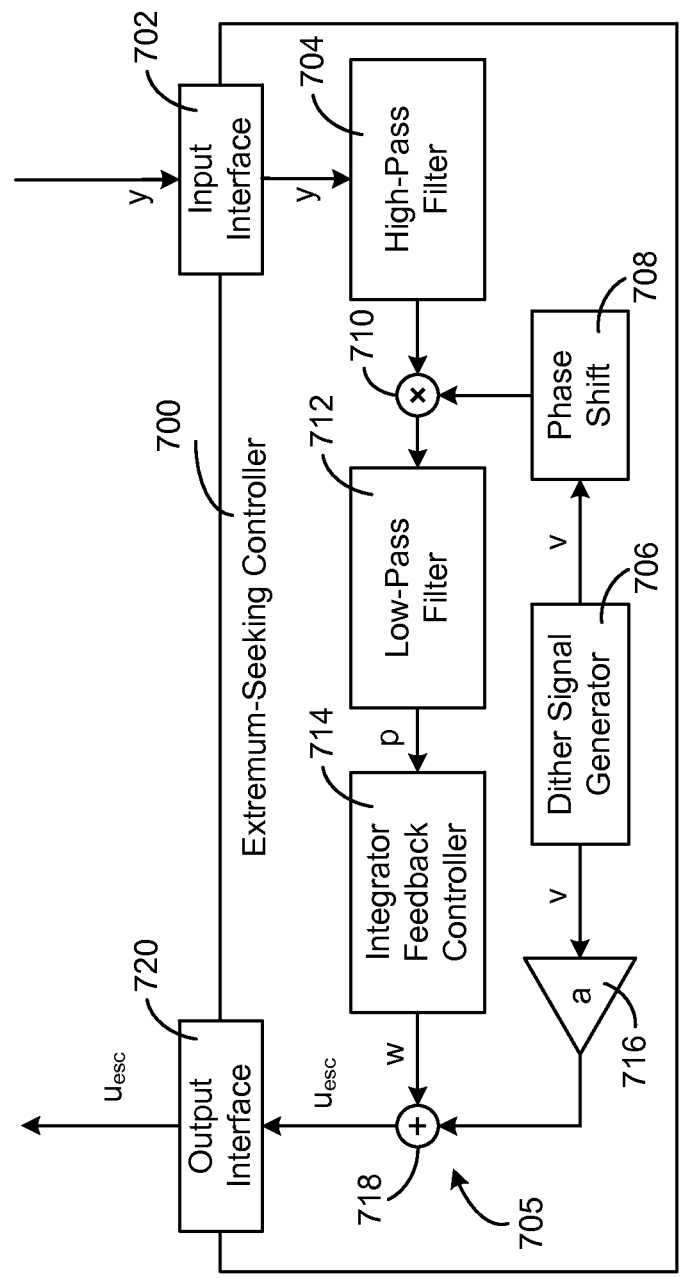
FIG. 7 is a block diagram of an extremum-seeking controller, according to some embodiments.

Referring now to FIG. 7, a block diagram of another extremum-seeking controller 700 is shown, according to some embodiments. Extremum-seeking controller 700 may use periodic dither signal. Extremum-seeking controller 700 may be used in control system 400 to replace extremum-seeking controller 420, in control system 500 to replace extremum-seeking controller 520, or in control system 600 to replace extremum-seeking controller 620. Extremum-seeking controller 700 uses an extremum-seeking control strategy to optimize a performance variable y received as an output from a plant (e.g., plant 430 of FIG. 4, plant 530 of FIG. 5, plant 630 of FIG. 6). Optimizing performance variable y can include minimizing y, maximizing y, controlling y to achieve a setpoint, or otherwise regulating the value of performance variable y.

Extremum-seeking controller 700 is shown receiving performance variable y via input interface 702 and providing performance variable y to a control loop 705 within controller 700. Control loop 705 is shown to include a high-pass filter 704, a demodulation element 710, a low-pass filter 712, an integrator feedback controller 714, and a dither signal element 718. Control loop 705 may be configured to extract a performance gradient p from performance variable y using a dither-demodulation technique. Integrator feedback controller 714 analyzes the performance gradient p and adjusts the DC component of the plant input (i.e., the variable w) to drive performance gradient p to zero.

The first step of the dither-demodulation technique is performed by dither signal generator 706 and dither signal element 718. Dither signal generator 706 generates a periodic dither signal v, which is typically a sinusoidal signal. Dither signal element 718 receives the dither signal v from dither signal generator 706 and the DC component of the plant input w from integrator feedback controller 714. Dither signal element 718 combines dither signal v with the DC component of the plant input w to generate the ESC contribution $u_{esc}$ to the manipulated variable u (e.g., $u_{esc}$=w+v). The ESC contribution $u_{esc}$ is combined with the feedforward contribution $u_{ff}$ to generate the manipulated variable u provided to and used by the plant to generate performance variable y as previously described.

The second step of the dither-demodulation technique is performed by high-pass filter 704, demodulation element 710, and low-pass filter 712. High-pass filter 704 filters the performance variable y and provides the filtered output to demodulation element 710. Demodulation element 710 demodulates the output of high-pass filter 704 by multiplying the filtered output by the dither signal v with a phase shift 708 applied. The DC component of this multiplication is proportional to the performance gradient p of performance variable y with respect to the control input u. The output of demodulation element 710 is provided to low-pass filter 712, which extracts the performance gradient p (i.e., the DC component of the demodulated output). The estimate of the performance gradient p is then provided to integrator feedback controller 714, which drives the performance gradient estimate p to zero by adjusting the DC component w of ESC contribution $u_{esc}$.

Still referring to FIG. 7, extremum-seeking controller 700 is shown to include an amplifier 716. It may be desirable to amplify the dither signal v such that the amplitude of the dither signal v is large enough for the effects of dither signal v to be evident in the plant output y. The large amplitude of dither signal v can result in large variations in the control input u, even when the DC component w remains constant. Due to the periodic nature of the dither signal v, the large variations in the plant input u (i.e., the oscillations caused by the dither signal v) are often noticeable to plant operators.

Additionally, it may be desirable to carefully select the frequency of the dither signal v to ensure that the ESC strategy is effective. For example, it may be desirable to select a dither signal frequency $\omega_v$ based on the natural frequency $\omega_n$ of the plant to enhance the effect of the dither signal v on the performance variable y. It can be difficult and challenging to properly select the dither frequency $\omega_v$ without knowledge of the dynamics of the plant.

In extremum-seeking controller 700, the output of high-pass filter 704 can be represented as the difference between the value of the performance variable y and the expected value of the performance variable y, as shown in the following equation:

$$y - E[y] \qquad \text{Output of High-Pass Filter:}$$

where the variable E[y] is the expected value of the performance variable y. The result of the cross-correlation performed by demodulation element 710 (i.e., the output of demodulation element 710) can be represented as the product of the high-pass filter output and the phase-shifted dither signal, as shown in the following equation:

$$(y - E[y])(v - E[v]) \qquad \text{Result of Cross-Correlation:}$$

where the variable E[v] is the expected value of the dither signal v. The output of low-pass filter 712 can be represented as the covariance of the dither signal v and the performance variable y, as shown in the following equation:

$$E[(y - E[y])(v - E[U])] = Cov(v,y) \qquad \text{Output of Low-Pass Filter:}$$

where the variable E[u] is the expected value of the control input u.

The preceding equations show that extremum-seeking controller 700 generates an estimate for the covariance Cov(v,y) between the dither signal v and the plant output (i.e., the performance variable y). The covariance Cov(v,y) can be used in extremum-seeking controller 700 as a proxy for the performance gradient p. For example, the covariance Cov(v,y) can be calculated by high-pass filter 704, demodulation element 710, and low-pass filter 712 and provided as a feedback input to integrator feedback controller 714. Integrator feedback controller 714 can adjust the DC value w of the plant input u in order to minimize the covariance Cov(v,y) as part of the feedback control loop.

Extremum-Seeking Control System with Stochastic Excitation Signal

Figure 8:
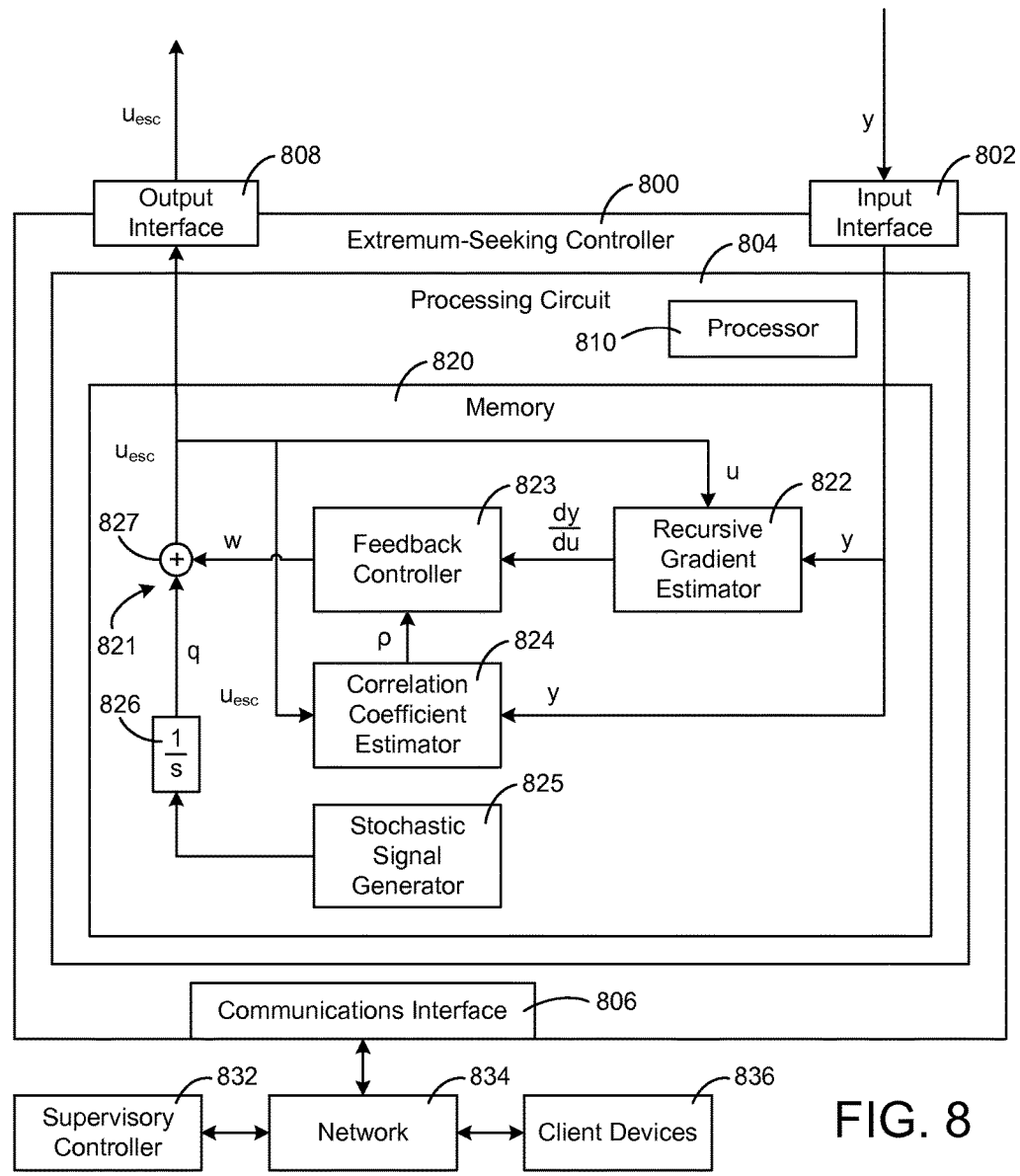
FIG. 8 is a block diagram of another extremum-seeking controller, according to some embodiments.

Referring now to FIG. 8, a block diagram of an extremum-seeking controller 800 with a stochastic excitation signal is shown, according to some embodiments. Extremum-seeking controller 800 may be used in control system 400 to replace extremum-seeking controller 420, in control system 500 to replace extremum-seeking controller 520, or in control system 600 to replace extremum-seeking controller 620. Extremum-seeking controller 800 is shown receiving a performance variable y as feedback from a plant (e.g., plant 430 of FIG. 4, plant 530 of FIG. 5, plant 630 of FIG. 6) via input interface 802 and providing an ESC contribution $u_{esc}$ to the manipulated variable u to the plant via output interface 808. Extremum-seeking controller 800 can use an extremum-seeking control (ESC) strategy to optimize the performance variable y received as an output from the plant. However, rather than perturbing the control input u with a periodic dither signal, extremum-seeking controller 800 may perturb the control input u with a stochastic excitation signal q. Extremum-seeking controller 800 can adjust the ESC contribution $u_{esc}$ to drive the gradient of performance variable y to zero. In this way, extremum-seeking controller 800 identifies values for ESC contribution $u_{esc}$ that achieve an optimal value (e.g., a maximum or a minimum) for performance variable y.

In some embodiments, the ESC logic implemented by extremum-seeking controller 800 generates values for ESC contribution $u_{esc}$ based on a received control signal (e.g., a setpoint, an operating mode signal, etc.). The control signal may be received from a user control (e.g., a thermostat, a local user interface, etc.), client devices 836 (e.g., computer terminals, mobile user devices, cellular phones, laptops, tablets, desktop computers, etc.), a supervisory controller 832, or any other external system or device. In various embodiments, extremum-seeking controller 800 can communicate with external systems and devices directly (e.g., using NFC, Bluetooth, WiFi direct, cables, etc.) or via a communications network 834 (e.g., a BACnet network, a LonWorks network, a LAN, a WAN, the Internet, a cellular network, etc.) using wired or wireless electronic data communications.

Extremum-seeking controller 800 is shown to include a communications interface 806, an input interface 802, and an output interface 808. Interfaces 806, 802, and 808 can include any number of jacks, wire terminals, wire ports, wireless antennas, or other communications interfaces for communicating information and/or control signals. Interfaces 806, 802, and 808 can be the same type of devices or different types of devices. For example, input interface 802 can be configured to receive an analog feedback signal (e.g., an output variable, a measured signal, a sensor output, a controlled variable) from the plant, whereas communications interface 806 can be configured to receive a digital setpoint signal from supervisory controller 832 via network 834. Output interface 808 can be a digital output (e.g., an optical digital interface) configured to provide a digital control signal (e.g., a manipulated variable, a control input) to the plant. In other embodiments, output interface 808 is configured to provide an analog output signal.

In some embodiments interfaces 806, 802, and 808 can be joined as one or two interfaces rather than three separate interfaces. For example, communications interface 806 and input interface 802 can be combined as one Ethernet interface configured to receive network communications from supervisory controller 832. In some embodiments, supervisory controller 832 provides both a setpoint and feedback via an Ethernet network (e.g., network 834). In such an embodiment, output interface 808 may be specialized for a controlled component of the plant. In other embodiments, output interface 808 can be another standardized communications interface for communicating data or control signals. Interfaces 806, 802, and 808 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 8, extremum-seeking controller 800 is shown to include a processing circuit 804 having a processor 810 and memory 820. Processor 810 can be a general purpose or specific purpose processor, an application specific integrated circuit (ASIC), one or more field programmable gate arrays (FPGAs), a group of processing components, or other suitable processing components. Processor 810 is configured to execute computer code or instructions stored in memory 820 or received from other computer readable media (e.g., CDROM, network storage, a remote server, etc.).

Memory 820 can include one or more devices (e.g., memory units, memory devices, storage devices, etc.) for storing data and/or computer code for completing and/or facilitating the various processes described in the present disclosure. Memory 820 can include random access memory (RAM), read-only memory (ROM), hard drive storage, temporary storage, non-volatile memory, flash memory, optical memory, or any other suitable memory for storing software objects and/or computer instructions. Memory 820 can include database components, object code components, script components, or any other type of information structure for supporting the various activities and information structures described in the present disclosure. Memory 820 can be communicably connected to processor 810 via processing circuit 804 and can include computer code for executing (e.g., by processor 810) one or more processes described herein.

Still referring to FIG. 8, extremum-seeking controller 800 is shown receiving performance variable y via input interface 802 and providing performance variable y to a control loop 821 within extremum-seeking controller 800. Control loop 821 is shown to include a recursive gradient estimator 822, a feedback controller 823, and an excitation signal element 827. Control loop 821 may be configured to determine the gradient $$\frac{dy}{du}$$

of the performance variable y with respect to the control input u and to adjust the DC component of the ESC contribution $u_{esc}$ (i.e., the variable w) to drive the gradient $$\frac{dy}{du}$$

to zero.

Recursive Gradient Estimation

Recursive gradient estimator 822 can be configured to estimate the gradient $$\frac{dy}{du}$$

of the performance variable y with respect to the control input u. The gradient $$\frac{dy}{du}$$

may be similar to the performance gradient p determined in extremum-seeking controller 700. However, the fundamental difference between extremum-seeking controller 800 and extremum-seeking controller 700 is the way that the gradient $$\frac{dy}{du}$$

is obtained. In extremum-seeking controller 800, the performance gradient p is obtained via the dither-demodulation technique described with reference to FIG. 7, which is analogous to covariance estimation. Conversely, the gradient $$\frac{dy}{du}$$

in extremum-seeking controller 800 is obtained by performing a recursive regression technique to estimate the slope of the performance variable y with respect to the control input u. The recursive estimation technique may be performed by recursive gradient estimator 822.

Recursive gradient estimator 822 can use any of a variety of recursive estimation techniques to estimate the gradient $$\frac{dy}{du}.$$

For example, recursive gradient estimator 822 can use a recursive least-squares (RLS) estimation technique to generate an estimate of the gradient $$\frac{dy}{du}.$$

In some embodiments, recursive gradient estimator 822 uses exponential forgetting as part of the RLS estimation technique. Exponential forgetting reduces the required amount of data storage relative to batch processing. Exponential forgetting also allows the RLS estimation technique to remain more sensitive to recent data and thus more responsive to a shifting optimal point. An example a RLS estimation technique which can be performed recursive gradient estimator 822 is described in detail below.

Recursive gradient estimator 822 is shown receiving the performance variable y from the plant and the ESC contribution $u_{esc}$ from excitation signal element 827. In some embodiments, recursive gradient estimator 822 receives multiple samples or measurements of the performance variable y and the ESC contribution $u_{esc}$ over a period of time. Recursive gradient estimator 822 can use a sample of the ESC contribution $u_{esc}$ at time k to construct an input vector $x_k$ as shown in the following equation:

$$x_k = \begin{bmatrix} 1 \\ u_k \end{bmatrix}$$

where $u_k$ is the value of the ESC contribution $u_{esc}$ at time k. Similarly, recursive gradient estimator 822 can construct a parameter vector $\hat{\theta}_k$ as shown in the following equation:

$$\hat{\theta}_k = \begin{bmatrix} \hat{\theta}_1 \\ \hat{\theta}_2 \end{bmatrix}$$

where the parameter $\hat{\theta}_2$ is the estimate of the gradient $$\frac{dy}{du}$$

at time k.

Recursive gradient estimator 822 can estimate the performance variable $\hat{y}_k$ at time k using the following linear model:

$$\hat{y}_k = x_k^T \hat{\theta}_{k-1}$$

The prediction error of this model is the difference between the actual value of the performance variable $y_k$ at time k and the estimated value of the performance variable $\hat{y}_k$ at time k as shown in the following equation:

$$e_k = y_k - \hat{y}_k = y_k - x_k^T \hat{\theta}_{k-1}$$

Recursive gradient estimator 822 can use the estimation error $e_k$ in the RLS technique to determine the parameter values $\hat{\theta}_k$. Any of a variety of RLS techniques can be used in various implementations. An example of a RLS technique which can be performed by recursive gradient estimator 822 is as follows:

$$g_k = P_{k-1} x_k (\lambda + x_k^T P_{k-1} x_k)^{-1}$$

$$P_k = \lambda^{-1} P_{k-1} - g_k x_k^T \lambda^{-1} P_{k-1}$$

$$\hat{\theta}_k = \hat{\theta}_{k-1} + e_k g_k$$

where $g_k$ is a gain vector, $P_k$ is a covariance matrix, and $\lambda$ is a forgetting factor ($\lambda < 1$). In some embodiments, the forgetting factor $\lambda$ is defined as follows:

$$\lambda = e^{-\frac{\Delta t}{\tau}}$$

where $\Delta t$ is the sampling period and $\tau$ is the forgetting time constant.

Recursive gradient estimator 822 can use the equation for $g_k$ to calculate the gain vector $g_k$ at time k based on a previous value of the covariance matrix $P_{k-1}$ at time k−1, the value of the input vector $x_k^T$ at time k, and the forgetting factor. Recursive gradient estimator 822 can use the equation for $P_k$ to calculate the covariance matrix $P_k$ at time k based on the forgetting factor $\lambda$, the value of the gain vector $g_k$ at time k, and the value of the input vector $x_k^T$ at time k. Recursive gradient estimator 822 can use the equation for $\hat{\theta}_k$ to calculate the parameter vector $\hat{\theta}_k$ at time k based on the error $e_k$ at time k and the gain vector $g_k$ at time k. Once the parameter vector $\hat{\theta}_k$ is calculated, recursive gradient estimator 822 can determine the value of the gradient $$\frac{dy}{du}$$

by extracting the value of the $\hat{\theta}_2$ parameter from $\hat{\theta}_k$, as shown in the following equations:

$$\hat{\theta}_k = \begin{bmatrix} \hat{\theta}_1 \\ \hat{\theta}_2 \end{bmatrix}, \frac{dy}{du} = \hat{\theta}_2$$

In various embodiments, recursive gradient estimator 822 can use any of a variety of other recursive estimation techniques to estimate $$\frac{dy}{du}.$$

For example, recursive gradient estimator 822 can use a Kalman filter, a normalized gradient technique, an unnormalized gradient adaption technique, a recursive Bayesian estimation technique, or any of a variety of linear or nonlinear filters to estimate $$\frac{dy}{du}.$$

In other embodiments, recursive gradient estimator 822 can use a batch estimation technique rather than a recursive estimation technique. As such, gradient estimator 822 can be a batch gradient estimator rather than a recursive gradient estimator. In a batch estimation technique, gradient estimator 822 can use a batch of previous values for the control input u and the performance variable y (e.g., a vector or set of previous or historical values) as inputs to a batch regression algorithm. Suitable regression algorithms may include, for example, ordinary least squares regression, polynomial regression, partial least squares regression, ridge regression, principal component regression, or any of a variety of linear or nonlinear regression techniques.

In some embodiments, it is desirable for recursive gradient estimator 822 to use a recursive estimation technique rather than a batch estimation technique due to several advantages provided by the recursive estimation technique. For example, the recursive estimation technique described above (i.e., RLS with exponential forgetting) has been shown to greatly improve the performance of the gradient estimation technique relative to batch least-squares. In addition to requiring less data storage than batch processing, the RLS estimation technique with exponential forgetting can remain more sensitive to recent data and thus more responsive to a shifting optimal point.

In some embodiments, recursive gradient estimator 822 estimates the gradient $$\frac{dy}{du}$$

using the covariance between the control input u and the performance variable y. For example, the estimate of the slope $\hat{\beta}$ in a least-squares approach can be defined as:

$$\hat{\beta} = \frac{\text{Cov}(u, y)}{\text{Var}(u)}$$

where Cov(u,y) is the covariance between the control input u and the performance variable y, and Var(u) is the variance of the control input u. Recursive gradient estimator 822 can calculate the estimated slope $\hat{\beta}$ using the previous equation and use the estimated slope $\hat{\beta}$ as a proxy for the gradient $$\frac{dy}{du}.$$

Notably, the estimated slope $\hat{\beta}$ is a function of only the control input u and the performance variable y. This is different from the covariance derivation technique described with reference to FIG. 7 in which the estimated performance gradient p was a function of the covariance between the dither signal v and the performance variable y. By replacing the dither signal v with the control input u, extremum-seeking controller 800 can generate an estimate for the slope $\hat{\beta}$ without any knowledge of the dither signal v (shown in FIG. 7) or the excitation signal q (shown in FIG. 8).

In some embodiments, recursive gradient estimator 822 uses a higher-order model (e.g., a quadratic model, a cubic model, etc.) rather than a linear model to estimate the performance variable $\hat{y}_k$. For example, recursive gradient estimator 822 can estimate the performance variable $\hat{y}_k$ at time k using the following quadratic model:

$$\hat{y}_k = \hat{\theta}_1 + \hat{\theta}_2 u_k + \hat{\theta}_3 u_k^2 + \epsilon_k$$

which can be written in the form $\hat{y}_k = x_k^T \hat{\theta}_{k-1}$ by updating the input vector $x_k$ and the parameter vector $\hat{\theta}_k$ as follows:

$$x_k = \begin{bmatrix} 1 \\ u_k \\ u_k^2 \end{bmatrix}$$

$$\hat{\theta}_k = \begin{bmatrix} \hat{\theta}_1 \\ \hat{\theta}_2 \\ \hat{\theta}_3 \end{bmatrix}$$

Recursive gradient estimator 822 can use the quadratic model to fit a quadratic curve (rather than a straight line) to the data points defined by combinations of the control input u and the performance variable y at various times k. The quadratic model provides second-order information not provided by the linear model and can be used to improve the convergence of feedback controller 823. For example, with a linear model, recursive gradient estimator 822 can calculate the gradient $$\frac{dy}{du}$$

at a particular location along the curve (i.e., for a particular value of the control input u) and can provide the gradient $$\frac{dy}{du}$$

as a feedback signal. For embodiments that use a linear model to estimate $\hat{y}_k$, the gradient $$\frac{dy}{du}$$

(i.e., the derivative of the linear model with respect to u) is a scalar value. When receiving a scalar value for the gradient $$\frac{dy}{du}$$

as a feedback signal, extremum-seeking controller 800 can incrementally adjust the value of the ESC contribution $u_{esc}$ in a direction that drives the gradient $$\frac{dy}{du}$$

optimal value of the control input u is reached (i.e., the value of the control input u that results in the gradient $$\frac{dy}{du}$$

$\left( i.e., \text{ the value of the control input } u \text{ that results in the gradient } \frac{dy}{du} = 0 \right).$ With a quadratic model, recursive gradient estimator 822 can provide feedback controller 823 with a function for the gradient $$\frac{dy}{du}$$

rather than a simple scalar value. For embodiments that use a quadratic model to estimate $\hat{y}_k$, the gradient $$\frac{dy}{du}$$

(i.e., the derivative of the quadratic model with respect to u) is a linear function of the control input u $\left( \text{e.g.}, \frac{dy}{du} = 2\hat{\theta}_3 u_k + \hat{\theta}_2 \right).$ When feedback controller 823 receives a linear function for the gradient $$\frac{dy}{du}$$

as a feedback signal, feedback controller 823 can analytically calculate the optimal value of the control input u that will result in the gradient $\frac{dy}{du} = 0 \left( \text{e.g.}, u_{k,opt} = -\frac{\hat{\theta}_2}{2\hat{\theta}_3} \right).$ Accordingly, feedback controller 823 can adjust the control input u using smart steps that rapidly approach the optimal value without relying on incremental adjustment and experimentation to determine whether the gradient $$\frac{dy}{du}$$

is moving toward zero.

Stochastic Excitation Signal

Still referring to FIG. 8, extremum-seeking controller 800 is shown to include a stochastic signal generator 825 and an integrator 826. In order to estimate the gradient $$\frac{dy}{du}$$

reliably, it may be desirable to provide sufficient variation in the control input u that carries through to the performance variable y. Extremum-seeking controller 800 can use stochastic signal generator 825 and integrator 826 to generate a persistent excitation signal q. The excitation signal q can be added to the DC value w of the control input u at excitation signal element 827 to form the feedforward contribution $u_{esc}$ (e.g., $u_{esc}$=w+q).

Stochastic signal generator 825 can be configured to generate a stochastic signal. In various embodiments, the stochastic signal can be a random signal (e.g., a random walk signal, a white noise signal, etc.), a non-periodic signal, an unpredictable signal, a disturbance signal, or any other type of non-deterministic or non-repeating signal. In some embodiments, the stochastic signal has a non-zero mean. The stochastic signal can be integrated by integrator 826 to generate the excitation signal q.

Excitation signal q can provide variation in the control input u sufficient for the gradient estimation technique performed by recursive gradient estimator 822. In some instances, the addition of excitation signal q causes the control input u to drift away from its optimum value. However, feedback controller 823 can compensate for such drift by adjusting the DC component w such that the control input u is continuously pulled back toward its optimum value. As with traditional ESC, the magnitude of the excitation signal q can be selected (e.g., manually by a user or automatically by extremum-seeking controller 800) to overcome any additive noise found in the performance variable y (e.g., process noise, measurement noise, etc.).

The stochastic excitation signal q generated by extremum-seeking controller 800 has several advantages over the periodic dither signal v generated by extremum-seeking controller 700 of FIG. 7. For example, the stochastic excitation signal q is less perceptible than a traditional periodic dither signal v. As such, the effects of the stochastic excitation signal q on the control input u are less noticeable than the periodic oscillations caused by the traditional periodic dither signal v.

Another advantage of the stochastic excitation signal q is that extremum-seeking controller 800 is simpler because the dither frequency $\omega_v$ is no longer a required parameter. Accordingly, controller 800 does not need to know or estimate the natural frequency of the plant when generating the stochastic excitation signal q. In some embodiments, extremum-seeking controller 800 provides multiple control inputs u to the plant. Each of the control inputs can be excited by a separate stochastic excitation signal q. Since each of the stochastic excitation signals q is random, there is no need to ensure that the stochastic excitation signals q are not correlated with each other. Extremum-seeking controller 800 can calculate the gradient $$\frac{dy}{du}$$

of the performance variable y with respect to each of the control inputs u without performing a frequency-specific dither-demodulation technique.

Correlation Coefficient

One of the problems with traditional ESC is that the performance gradient $$\frac{dy}{du}$$

is a function of the range or scale of the performance variable y. The range or scale of the performance variable y can depend on the static and dynamic components of the plant. For example, the plant may include a nonlinear function $f(u)$ in series with a constant gain K. It is apparent from this representation that the range or scale of the performance variable y is a function of the constant gain K.

The value of the performance gradient $$\frac{dy}{du}$$

may vary based on the value of the control input u due to the nonlinearity provided by the nonlinear function $f(u)$. However, the scale of the performance gradient $$\frac{dy}{du}$$

is also dependent upon the value of the constant gain K. For example, the performance gradient $$\frac{dy}{du}$$

can be determined using the following equation:

$$\frac{dy}{du} = Kf'(u)$$

where K is the constant gain and $f'(u)$ is the derivative of the function $f(u)$. It can be desirable to scale or normalize the performance gradient $$\frac{dy}{du}$$

(e.g., by multiplying by a scaling parameter κ) in order to provide consistent feedback control loop performance. However, without knowledge of the scale of the performance variable y (e.g., without knowing the constant gain K applied by the plant), it can be challenging to determine an appropriate value for the scaling parameter κ.

Still referring to FIG. 8, extremum-seeking controller 800 is shown to include a correlation coefficient estimator 824. Correlation coefficient estimator 824 can be configured to generate a correlation coefficient ρ and provide the correlation coefficient ρ to feedback controller 823. The correlation coefficient ρ can be related to the performance gradient $$\frac{dy}{du}$$

$$\left(e.g., \text{proportional to } \frac{dy}{du}\right)$$

but scaled based on the range of the performance variable y. For example, the correlation coefficient ρ can be a normalized measure of the performance gradient $$\frac{dy}{du}$$

(e.g., scaled to the range 0≤ρ≤1).

Correlation coefficient estimator 824 is shown receiving the control input u and the performance variable y as inputs. Correlation coefficient estimator 824 can generate the correlation coefficient ρ based on the variance and covariance of the control input u and the performance variable y, as shown in the following equation:

$$\rho = \frac{\text{Cov}(u, y)}{\sqrt{\text{Var}(u)\text{Var}(y)}}$$

where Cov(u,y) is the covariance between the control input u and the performance variable y, Var(u) is the variance of the control input u, and Var(y) is the variance of the performance variable y. The previous equation can be rewritten in terms of the standard deviation $\sigma_u$ of the control input u and the standard deviation $\sigma_y$ of the performance variable y as follows:

$$\rho = \frac{\text{Cov}(u, y)}{\sigma_u \sigma_y}$$

where $\text{Var}(u) = \sigma_u^2$ and $\text{Var}(y) = \sigma_y^2$.

In some embodiments, correlation coefficient estimator 824 estimates the correlation coefficient ρ using a recursive estimation technique. For example, correlation coefficient estimator 824 can calculate exponentially-weighted moving averages (EWMAs) of the control input u and the performance variable y using the following equations:

$$\bar{u}_k = \bar{u}_{k-1} + \frac{u_k - \bar{u}_{k-1}}{\min(k, W)}$$

$$\bar{y}_k = \bar{y}_{k-1} + \frac{y_k - \bar{y}_{k-1}}{\min(k, W)}$$

where $\bar{u}_k$ and $\bar{u}_k$ are the EWMAs of the control input u and the performance variable y at time k, $\bar{u}_{k-1}$ and $\bar{y}_{k-1}$ are the previous EWMAs of the control input u and the performance variable y at time k−1, $u_k$ and $y_k$ are the current values of the control input u and the performance variable y at time k, k is the total number of samples that have been collected of each variable, and W is the duration of the forgetting window.

Similarly, correlation coefficient estimator 824 can calculate EWMAs of the control input variance Var(u), the performance variable variance Var(y), and the covariance Cov(u,y) using the following equations:

$$V_{u,k} = V_{u,k-1} + \frac{(u_k - \bar{u}_k)^2 - V_{u,k-1}}{\min(k, W)}$$

$$V_{y,k} = V_{y,k-1} + \frac{(y_k - \bar{y}_k)^2 - V_{y,k-1}}{\min(k, W)}$$

$$c_k = c_{k-1} + \frac{(y_k - \bar{y}_k)(u_k - \bar{u}_k) - c_{k-1}}{\min(k, W)}$$

where $V_{u,k}$, $V_{y,k}$, and $c_k$ are the EWMAs of the control input variance Var(u), the performance variable variance Var(y), and the covariance Cov(u,y), respectively, at time k. $V_{u,k-1}$, $V_{y,k-1}$, and $c_{k-1}$ are the EWMAs of the control input variance Var(u), the performance variable variance Var(y), and the covariance Cov(u,y), respectively, at time k−1. Correlation coefficient estimator 824 can generate an estimate of the correlation coefficient ρ based on these recursive estimates using the following equation:

$$\hat{\rho}_k = \frac{c_k}{\sqrt{V_{u,k} V_{y,k}}}$$

In some embodiments, correlation coefficient estimator 824 generates the correlation coefficient ρ based on the estimated slope $\hat{\beta}$. As previously described, the estimated slope $\hat{\beta}$ can be calculated using the following equation:

$$\hat{\beta} = \frac{\text{Cov}(u, y)}{\text{Var}(u)} = \frac{\text{Cov}(u, y)}{\sigma_u^2}$$

where Cov(u,y) is the covariance between the control input u and the performance variable y, and Var(u) is the variance of the control input u (i.e., $\sigma_u^2$). Correlation coefficient estimator 824 can calculate the correlation coefficient ρ from the slope $\hat{\beta}$ using the following equation:

$$\rho = \hat{\beta} \frac{\sigma_u}{\sigma_y}$$

From the previous equation, it can be seen that the correlation coefficient ρ and the estimated slope $\hat{\beta}$ are equal when the standard deviations $\sigma_u$ and $\sigma_y$ are equal (i.e., when $\sigma_u = \sigma_y$).

Correlation coefficient estimator 824 can receive the estimated slope $\hat{\beta}$ from recursive gradient estimator 822 or calculate the estimated slope $\hat{\beta}$ using a set of values for the control input u and the performance variable y. For example, with the assumption of finite variance in u and y, correlation coefficient estimator 824 can estimate the slope using the following least squares estimation:

$$\hat{\beta} = \left( \sum_{i=t-N}^{t} u_i u_i^T \right)^{-1} \left( \sum_{i=t-N}^{t} u_i y_i \right)$$

For a small range of the control input u, the estimated slope $\hat{\beta}$ can be used as a proxy for the performance gradient, as shown in the following equation:

$$\hat{\beta} = \frac{dy}{du} = K f'(u)$$

As shown in the previous equation, the estimated slope $\hat{\beta}$ contains the constant gain K, which may be unknown. However, normalization provided by the standard deviations $\sigma_u$ and $\sigma_y$ cancels the effect of the constant gain K. For example, the standard deviation $\sigma_y$ of the performance variable y is related to the standard deviation $\sigma_u$ of the control input u as shown in the following equations:

$$\sigma_y = K \sigma_u$$

$$\frac{\sigma_u}{\sigma_y} = \frac{1}{K}$$

Multiplying the estimated slope $\hat{\beta}$ by the ratio $$\frac{\sigma_u}{\sigma_y}$$

to calculate the correlation coefficient ρ is equivalent to dividing by the constant gain K. Both the correlation coefficient ρ and the estimated slope $\hat{\beta}$ indicate the strength of the relationship between the control input u and the performance variable y. However, the correlation coefficient ρ has the advantage of being normalized which makes tuning the feedback control loop much simpler.

In some embodiments, the correlation coefficient ρ is used by feedback controller 823 instead of the performance gradient $$\frac{dy}{du}.$$

For example, feedback controller 823 can adjust the DC value w of the control input u to drive the correlation coefficient ρ to zero. One advantage of using the correlation coefficient ρ in place of the performance gradient $$\frac{dy}{du}$$

is that the tuning parameters used by feedback controller 823 can be a general set of tuning parameters which do not need to be customized or adjusted based on the scale of the performance variable y. This advantage eliminates the need to perform control-loop-specific tuning for feedback controller 823 and allows feedback controller 823 to use a general set of tuning parameters that are applicable across many different control loops and/or plants.

Control Techniques Combining ESC and Feedforward Control

Referring now to FIG. 9, a flow diagram 900 illustrating a control method combining ESC and feedforward control is shown, according to some embodiments. The control method shown in flow diagram 900 can be performed by one or more components of a control system (e.g., control system 400 of FIG. 4, control system 500 of FIG. 5, control system 600 of FIG. 6) to monitor and control a plant (e.g., plant 430 of FIG. 4, plant 530 of FIG. 5, plant 630 of FIG. 6).

Flow diagram 900 is shown to include providing a control input u to a plant (block 902) and receiving a measurable disturbance d' (block 904). The control input u can be provided by a control system combining an extremum-seeking controller and a feedforward controller, as described with reference to FIGS. 4-6. The feedforward controller can be any of the feedforward controllers previously described (e.g., feedforward controllers 410, 510, 610). The extremum-seeking controller can be any of the extremum-seeking controllers previously described (e.g., extremum-seeking controllers 420, 520, 620, 700, 800).

A plant in control theory is the combination of a process and one or more mechanically-controlled outputs. The plant can be any of the plants previously described (e.g., plants 430, 530, 630) or any other controllable system or process. For example, the plant can be an air handling unit configured to control temperature within a building space via one or more mechanically-controlled actuators and/or dampers. In various embodiments, the plant can include a chiller operation process, a damper adjustment process, a mechanical cooling process, a ventilation process, a refrigeration process, or any other process in which a control input u to the plant is adjusted to affect the performance variable y. The performance variable y can be a measured variable observed by one or more sensors of the plant (e.g., a measured temperature, a measured power consumption, a measured flow rate, etc.), a calculated variable based on measured or observed values (e.g., a calculated efficiency, a calculated power consumption, a calculated cost, etc.) or any other type of variable that indicates the performance of the plant in response to the control input u.

The control system is configured to achieve an optimal value for a performance variable y by adjusting the control input u. The optimal value can be an extremum (e.g., a maximum or a minimum) of the performance variable y. The optimal value of the performance variable y may change as disturbances d occur. The disturbances d includes a portion that is measurable (i.e., measurable disturbance d') and a portion that is not measurable. The measurable disturbance d' may include, for example, ambient temperature that can be measured by a thermometer, a load on the system that can be measured by a load sensor, etc. The non-measurable portion of disturbances d may include, for example, process noise, system noise, etc. The sensors that measures d' can be or not be a part of the plant.

Flow diagram 900 is shown to include generating a feedforward contribution $u_{ff}$ to the control input u using the measurable disturbance d' (block 906). The feedforward contribution $u_{ff}$ can be generated by any operations as described with reference to FIGS. 4-5. For example, a feedforward model or lookup table, may be used to map the measurable disturbance d' to feedforward contribution $u_{ff}$. The feedforward model may include a correlation between the measurable disturbance d' and the manipulated variable u. In some embodiments, the correlation may be established based on data collected during various tests and/or actual applications (i.e., past data). In other embodiments, the correlation between the measurable disturbance d' and the feedforward contribution $u_{ff}$ may be derived from theoretical models and/or mathematic computation. In other embodiments, a lookup table may be used to map the measurable disturbance d' onto the feedforward contribution $u_{ff}$. The lookup table may be constructed based on data collected during various tests and/or actual applications (i.e., past data) or theoretical models and/or mathematic computation.

Flow diagram 900 is shown to include receiving a performance variable y as a feedback from the plant (block 908) and generating an extremum-seeking contribution $u_{esc}$ to the control input u to drive the performance variable y to an optimal value (block 910). The extremum-seeking contribution $u_{esc}$ is a correction to the feedforward contribution $u_{ff}$ and used to drive the performance variable y to the optimal value. The process of generating the extremum-seeking contribution $u_{esc}$ to drive the performance variable y to the optimal value can be any process described with reference to FIGS. 4-8. The ESC contribution $u_{esc}$ may include an AC component and a DC component. In some embodiments, a periodic (e.g., sinusoidal) perturbation signal or dither signal is used as the AC component to perturb the value of manipulated variable u in order to extract a performance gradient p (e.g., FIG. 7). In other embodiments, a stochastic excitation signal q is used as the AC component to perturb the value of manipulated variable u in order to extract a performance gradient p (e.g., FIG. 8). The performance gradient p represents the gradient or slope of the performance variable y with respect to the manipulated variable u. The performance variable y is optimized by finding a DC component of the ESC contribution $u_{esc}$ that drives the performance gradient p to zero. The DC component may be recursively updated based on a measurement or other indication of the performance variable y received from the plant. In some embodiments, an integrator is used to drive the performance gradient p to zero.

Flow diagram 900 is shown to include generating a new control input u by combining the extremum-seeking contribution $u_{esc}$ and the feedforward contribution $u_{ff}$ (block 912). The new control input u can be provided to the plant.

Figures 9A, 9B:
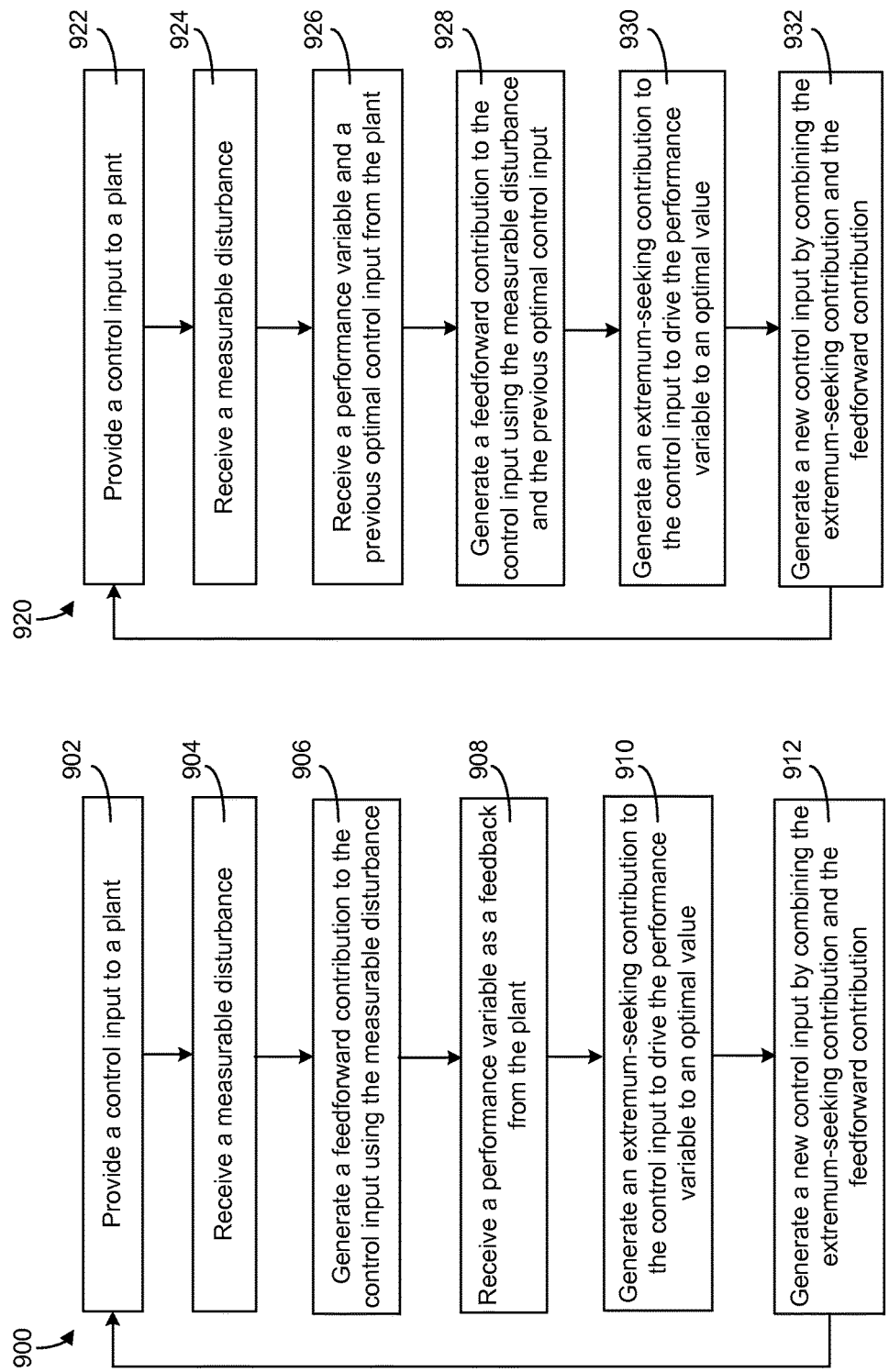
FIG. 9A is a flow diagram illustrating a control method combining ESC and feedforward control, according to some embodiments.
FIG. 9B is a flow diagram illustrating another control method combining ESC and feedforward control, according to some embodiments.

Referring now to FIG. 9B, a flow diagram 920 illustrating another control method combining ESC and feedforward control is shown, according to some embodiments. The control method shown in flow diagram 920 can be performed by one or more components of a control system (e.g., control system 400 of FIG. 4, control system 500 of FIG. 5, control system 600 of FIG. 6) to monitor and control a plant (e.g., plant 430 of FIG. 4, plant 530 of FIG. 5, plant 630 of FIG. 6).

Flow diagram 920 is shown to include providing a control input u to a plant (block 922) and receiving a measurable disturbance d' (block 924), which can be the same as or similar to block 902 and 904 of FIG. 9A.

Flow diagram 920 is shown to include receiving a performance variable y and a previous optimum control input $u_0$ from the plant (block 926). Receiving the performance variable y can be the same as or similar to block 908 of FIG. 9B. The previous optimum control input $u_0$ refers to a value of the control input u that drives the performance variable y to the optimum for a previously given measurable disturbance $d'_0$. The control input u would ultimately converge to a value $u_0$ that drives the performance variable y to optimum. The plant may store the value $u_0$ and provide the value $u_0$ to the control system.

Flow diagram 920 is shown to include generating a feedforward contribution $u_{ff}$ to the control input u using the measurable disturbance d' and the previous optimal control input $u_0$ (block 928). In some embodiments, an error $u_{err}$ between the value $u_0$ and the feedforward contribution $u_{ff0}$ for the measurable disturbance do is calculated (e.g., $u_{err}=u_0-u_{ff0}$). The error $u_{err}$ represents the difference between the value $u_O$ that ultimately drives the performance variable y to optimum and the feedforward contribution $u_{ff0}$ determined from the feedforward table or lookup table for the previous measurable disturbance $d'_O$. The error $u_{err}$ is used to correct the feedforward contribution $u_{ff}$ when another value of measurable disturbance d' is received. In some embodiments, the error $u_{err}$ is used to directly correct the feedforward contribution $u_{ff}$ determined from the feedforward model or lookup table (i.e., $u_{ff}+u_{err}$). In other embodiments, the error $u_{err}$ is used to update the feedforward model or the lookup table rather than directly correct the feedforward contribution determined from the feedforward model or the lookup table. If the feedforward model of the correlation between the measurable disturbances d' and the feedforward contribution $u_{ff}$ is used, the correlation may be updated in order to reduce the error $u_{err}$ for the previous measurable disturbance $d'_O$. If a lookup table is used, the data in the lookup data may be corrected with the error $u_{err}$.

Flow diagram 920 is shown to include generating an extremum-seeking contribution $u_{esc}$ to the control input u to drive the performance variable y to an optimal value (block 922) and generating a new control input u by combining the extremum-seeking contribution $u_{esc}$ and the feedforward contribution $u_{ff}$ (block 924), which can be the same as or similar to block 910 and 912 of FIG. 9A.

Example Implementations

Referring now to FIGS. 10A-11C, several example implementations of control systems and methods of the present disclosure are shown. The implementations shown in FIGS. 10A-11C illustrate various embodiments of a plant which can be controlled by the controller combining ESC and feedforward control.

Chilled Water Plant 1000

Figure 10A:
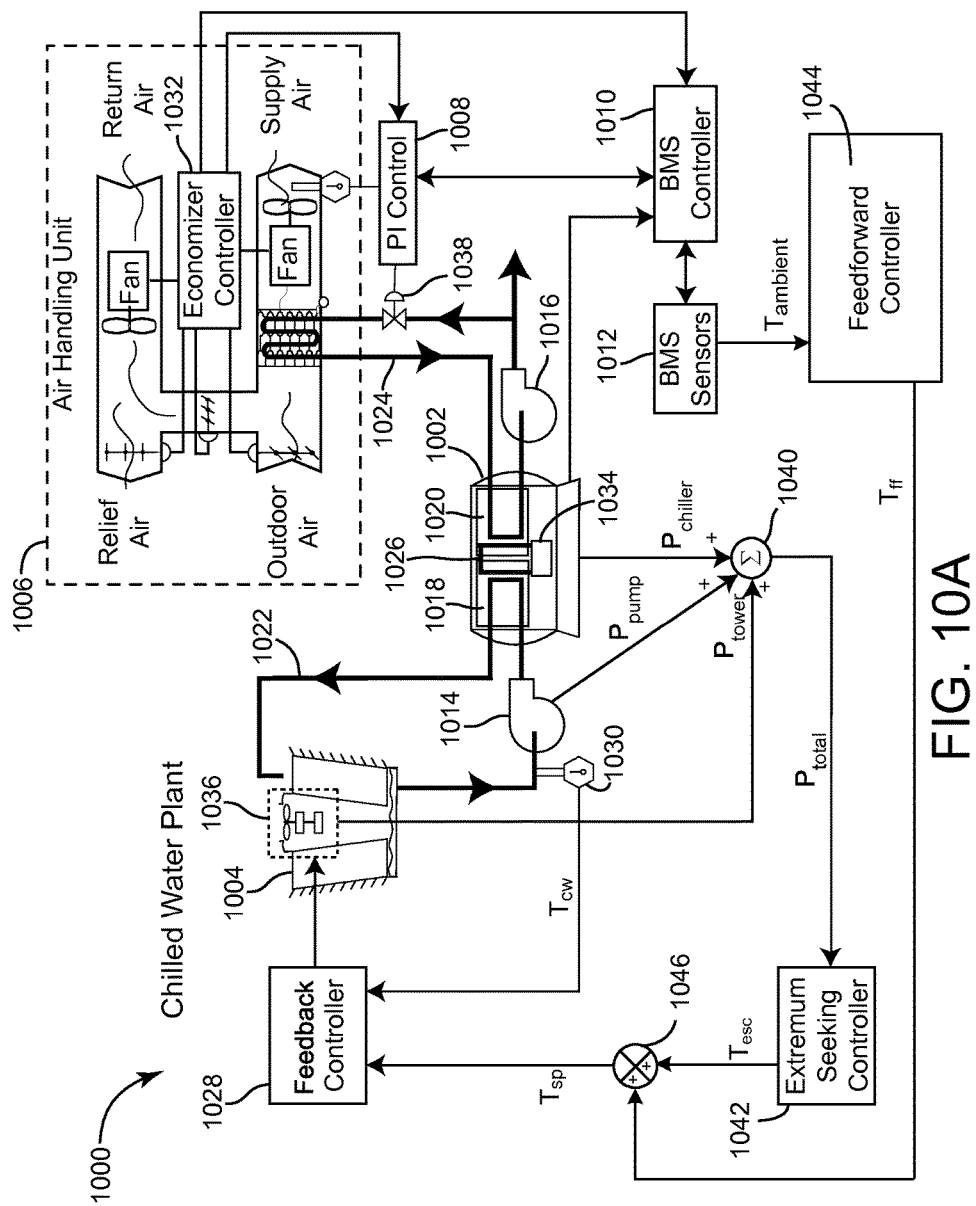
FIG. 10A is a block diagram of a chilled water plant in which the systems and methods of the present disclosure can be implemented to control the setpoint of condenser water temperature in the plant, according to some embodiments.

Referring particularly to FIG. 10A, a chilled water plant 1000 is shown, according to some embodiments. Chilled water plant 1000 is shown to include a chiller 1002, a cooling tower 1004, and an air handling unit (AHU) 1006. Chiller 1002 includes a condenser 1018, an evaporator 1020, and a compressor 1034. Compressor 1034 is configured to circulate a refrigerant between condenser 1018 and evaporator 1020 via a refrigerant loop 1026. Chiller 1002 also includes at least one expansion valve on refrigerant loop 1026 between condenser 1018 and evaporator 1020. Chiller 1002 operates using a vapor compression refrigeration cycle in which the refrigerant in refrigerant loop 1026 absorbs heat in evaporator 1020 and rejects heat in condenser 1018. Chiller 1002 can include any number of sensors, control valves, and/or other components that assist the refrigeration cycle operation of chiller 1002.

Chiller 1002 is connected with cooling tower 1004 by a condenser water loop 1022. A water pump 1014 located along condenser water loop 1022 circulates condenser water between cooling tower 1004 and chiller 1002 via condenser water loop 1022. Pump 1014 can be a fixed speed pump or a variable speed pump. Condenser water loop 1022 circulates the condenser water through condenser 1018 where the condenser water absorbs heat from the refrigerant in refrigeration loop 1026. The heated condenser water is then delivered to cooling tower 1004 where the condenser water rejects heat to the ambient environment. A cooling tower fan system 1036 provides airflow through cooling tower 1004 to facilitate cooling the condenser water within cooling tower 1004. The cooled condenser water is then pumped back to chiller 1002 by pump 1014.

Chiller 1002 is connected with AHU 1006 via a chilled fluid loop 1024. A chilled fluid pump 1016 located along chilled fluid loop 1024 circulates a chilled fluid between chiller 1002 and AHU 1006. Pump 1016 can be a fixed speed pump or a variable speed pump. Chilled fluid loop 1024 circulates the chilled fluid through evaporator 1020 where the chilled fluid rejects heat to the refrigerant in refrigeration loop 1026. The chilled fluid is then delivered to AHU 1006 where the chilled fluid absorbs heat from the supply air passing through AHU 1006, thereby providing cooling for the supply air. The heated fluid is then pumped back to chiller 1002 by pump 1016.

In the embodiment shown in FIG. 10A, AHU 1006 is shown as an economizer type air handling unit. Economizer type AHUs vary the amount of outdoor air and return air used by the AHU for cooling. AHU 1006 is shown to include economizer controller 1032 that utilizes one or more algorithms (e.g., state based algorithms, extremum seeking control algorithms, etc.) to affect the actuators and dampers or fans of AHU 1006. The flow of chilled fluid supplied to AHU 1006 can also be variably controlled. For example, PI control 1008 is shown controlling a valve 1038 that regulates the flow of the chilled fluid to AHU 1006. PI control 1008 can control the chilled fluid flow to AHU 1006 to achieve a setpoint supply air temperature. Economizer controller 1032, a controller for chiller 1002, and PI control 1008 can be supervised by one or more building management system (BMS) controllers 1010.

A BMS controller is, in general, a computer-based system configured to control, monitor, and manage equipment in or around a building or building area. A BMS controller can include a METASYS® brand building controller or other devices sold by Johnson Controls, Inc. BMS controller 1010 can provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices. For example, BMS controller 1010 can provide a web-based graphical user interface that allows a user to set a desired setpoint temperature for a building space. BMS controller 1010 can use BMS sensors 1012 (connected to BMS controller 1010 via a wired or wireless BMS or IT network) to determine if the setpoint temperatures for the building space are being achieved. BMS controller 1010 can use such determinations to provide commands to PI control 1008, chiller 1002, economizer controller 1032, or other components of the building's HVAC system.

Feedforward controller 1044 is shown to receive an indication of the ambient temperature $T_{ambient}$ from a component (e.g., a thermometer) of BMS sensors 1012. In some embodiments, BMS controller 1010 collects the information provided by the BMS sensors 1012 and provides the ambient temperature $T_{ambient}$ to feedforward controller 1044. Feedforward controller 1044 creates a feedforward contribution $T_{ff}$ to the temperature setpoint $T_{sp}$ for the condenser water temperature in chilled water plant 1000. In some embodiments, feedforward controller 1044 includes a feedforward model or lookup table that maps the ambient temperature $T_{ambient}$ to the feedforward contribution $T_{ff}$.

In some embodiments, extremum seeking controller 1042 does not receive control commands from BMS controller 1010 or does not base its output calculations on an input from BMS controller 1010. In other embodiments, extremum seeking controller 1042 receives information (e.g., commands, setpoints, operating boundaries, etc.) from BMS controller 1010. For example, BMS controller 1010 can provide extremum seeking controller 1042 with a high setpoint limit and a low setpoint limit for the condensed water temperature. A low limit can avoid operation near the mechanical or thermal limits of the fan system while a high limit may avoid frequent component and power taxing fan start-ups.

Extremum seeking controller 1042 is shown receiving a power input $P_{total}$ representing the total power consumed by cooling tower fan system 1036 $P_{tower}$, condenser water pump 1014 $P_{pump}$, and the compressor 1034 of chiller 1002 $P_{chiller}$ (i.e., $P_{total}=P_{tower}+P_{pump}+P_{chiller}$). As illustrated in FIG. 10A, the power inputs $P_{tower}$, $P_{pump}$, and $P_{chiller}$ can be summed outside of extremum seeking controller 1042 at summing block 1040 to provide a combined signal representative of the total power $P_{total}$. In other embodiments, extremum seeking controller 1042 receives the individual power inputs $P_{tower}$, $P_{pump}$ and $P_{chiller}$ and conducts the summation of summing block 1040. In either case, extremum seeking controller 1042 can be said to receive the power inputs $P_{tower}$, $P_{pump}$, and $P_{chiller}$ even if the power inputs are provided as a single summed or combined signal $P_{total}$ representing the total system power.

In some embodiments, the total system power $P_{total}$ is the performance variable which extremum seeking controller 1042 seeks to optimize (e.g., minimize). The total system power $P_{total}$ can include the power consumption of one or more components of chilled water plant 1000. In the embodiment shown in FIG. 10A, the total system power $P_{total}$ includes $P_{tower}$, $P_{pump}$, and $P_{chiller}$. However, in various other embodiments, the total system power $P_{total}$ can include any combination of power inputs. For example, the total system power $P_{total}$ can include the power consumption of the fans within AHU 1006, the power consumption of chilled fluid pump 1016, and/or any other power consumption that occurs within chilled water plant 1000.

Extremum seeking controller 1042 is shown providing an ESC contribution $T_{esc}$ to the temperature setpoint $T_{sp}$ to a temperature setpoint element 1046. The temperature setpoint element 1046 combines the ESC contribution $T_{esc}$ output from extremum seeking controller 1042 and the feedforward contribution $T_{ff}$ output from feedforward controller 1044 to produce the temperature setpoint $T_{sp}$. The temperature setpoint element 1046 provides the temperature setpoint $T_{sp}$ to a feedback controller 1028. In some embodiments, the temperature setpoint $T_{sp}$ is the manipulated variable which extremum seeking controller 1042 adjusts to affect the total system power $P_{total}$. The temperature setpoint $T_{sp}$ is a setpoint for the temperature of the condenser water $T_{cw}$ provided to chiller 1002 from cooling tower 1004. The condenser water temperature $T_{cw}$ can be measured by a temperature sensor 1030 located along condenser water loop 1022 between cooling tower 1004 and chiller 1002 (e.g., upstream or downstream of pump 1014). Feedback controller 1028 is shown receiving the condenser water temperature $T_{cw}$ as a feedback signal.

Feedback controller 1028 can operate cooling tower fan system 1036 and/or condenser water pump 1014 to achieve the temperature setpoint $T_{sp}$ provided by temperature setpoint element 1046. For example, feedback controller 1028 can increase the speed of cooling tower fan system 1036 to increase the amount of heat removed from the condenser water by cooling tower 1004 or decrease the speed of cooling tower fan system 1036 to decrease the amount of heat removed from the condenser water by cooling tower 1004.

Extremum seeking controller 1042 implements an extremum seeking control strategy that dynamically searches for an unknown input (e.g., optimal condenser water temperature setpoint $T_{sp}$) to obtain system performance (e.g., total power consumption $P_{total}$) that trends near optimal. Although feedback controller 1028 and extremum seeking controller 1042 are shown as separate devices, it is contemplated that feedback controller 1028 and extremum seeking controller 1042 can be combined into a single device in some embodiments (e.g., a single controller that performs the functions of both extremum seeking controller 1042 and feedback controller 1028). For example, extremum seeking controller 1042 can be configured to control cooling tower fan system 1036 directly without requiring an intermediate feedback controller 1028.

Referring now to FIGS. 10B and 10C, a pair of flow diagrams 1050 and 1070 illustrating the operation of setpoint control in chilled water plant 1000 are shown, according to some embodiments. In both flow diagrams 1050 and 1070, an ambient temperature $T_{ambient}$ is provided to feedforward controller 1044, a temperature setpoint $T_{sp}$ is provided to a feedback controller 1028. Feedback controller 1028 operates to control condenser water temperature $T_{cw}$ in a chilled water plant 1000. Extremum seeking controller 1042 can receive a total power consumption $P_{total}$ of the chilled water plant 1000 as a feedback signal. In some embodiments, feedforward controller 1044 uses a previous optimum temperature setpoint $T_{sp0}$ to correct its output.

In flow diagram 1050, a temperature setpoint $T_{sp}$ is provided to feedback controller 1028 that operates to control condenser water temperature $T_{cw}$ in chilled water plant 1000 (block 1052). Feedforward controller 1044 receives an ambient temperature T ambient (block 1054) and generates a feedforward contribution $T_{ff}$ to the temperature setpoint $T_{sp}$ using the ambient temperature T ambient (block 1056). Extremum-seeking controller 1042 receives the total power consumption $P_{total}$ of chilled water plant 1000 as a feedback signal (block 1058) and generates an extremum-seeking contribution $T_{esc}$ to the temperature setpoint $T_{sp}$ to drive the total power consumption $P_{total}$ to an optimal value (block 1060). Temperature setpoint element 1046 generates a new temperature setpoint by combining the extremum-seeking contribution $T_{esc}$ and the feedforward contribution $T_{ff}$ (block 1062). The new temperature setpoint can be provided to feedback controller 1028.

In flow diagram 1070, a temperature setpoint $T_{sp}$ is provided to feedback controller 1028 that operates to control condenser water temperature $T_{cw}$ in chilled water plant 1000 (block 1072). Feedforward controller 1044 receives an ambient temperature T ambient (block 1074). Feedforward controller 1044 receives a previous optimal temperature setpoint $T_{sp0}$ from chilled water plant 1000 and extremum-seeking controller 1042 receives a total power consumption $P_{total}$ of chilled water plant 1000 as a feedback signal (block 1076). Feedforward controller 1044 generates a feedforward contribution $T_{ff}$ to the temperature setpoint $T_{sp}$ using the previous optimal temperature setpoint $T_{sp0}$ and the ambient temperature T ambient (block 1078). Extremum-seeking controller 1042 generates an extremum-seeking contribution $T_{esc}$ to the temperature setpoint $T_{sp}$ to drive the total power consumption P total to an optimal value (block 1080). Temperature setpoint element 1046 generates a new temperature setpoint by combining the extremum-seeking contribution $T_{esc}$ and the feedforward contribution $T_{ff}$ (block 1082). The new temperature setpoint can be provided to feedback controller 1028.

Figure 10D:
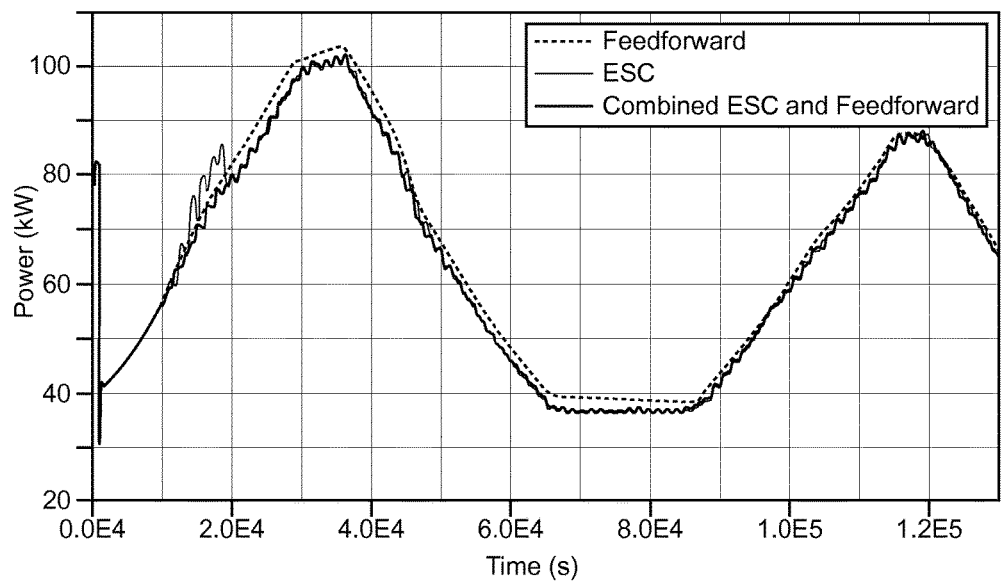
FIG. 10D is a graph comparing the power consumption changing over time for feedforward control, ESC, and combined ESC and feedforward control, according to some embodiments.
Figure 10E:
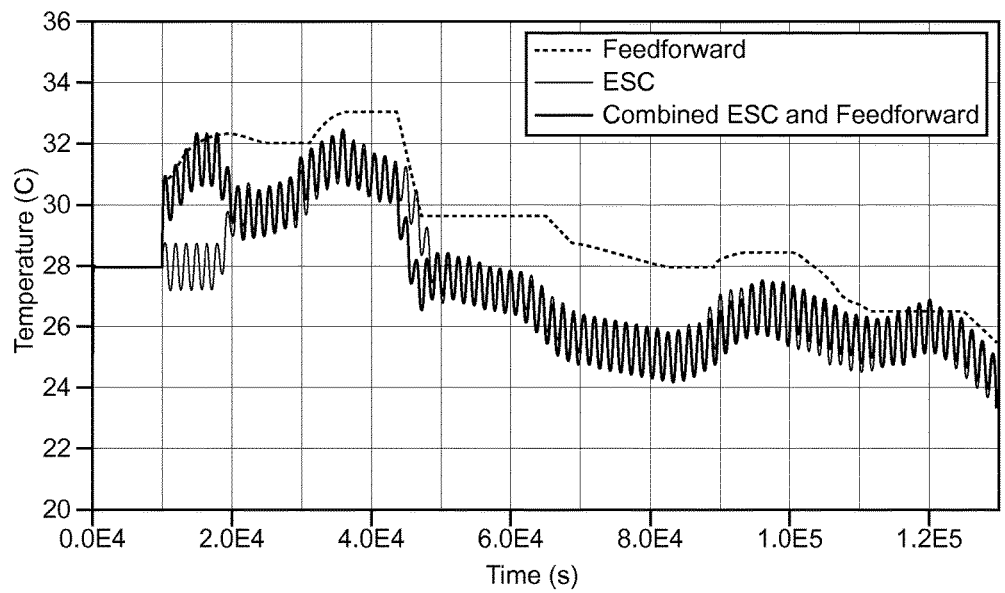
FIG. 10E is a graph comparing the setpoint of condenser water temperature changing over time for feedforward control, ESC, and combined ESC and feedforward control, according to some embodiments.

FIGS. 10D and 10E illustrate the simulation results of different control techniques. FIG. 10D is a graph comparing the power consumption changing over time for feedforward control, ESC, and combined ESC and feedforward control, according to some embodiments. FIG. 10E is a graph comparing the setpoint of condenser water temperature changing over time for feedforward control, ESC, and combined ESC and feedforward control, according to some embodiments. The condenser water setpoint was held constant at 28° C. for the initial 10,000 seconds of the simulation. After that, various strategies were applied to control the setpoint. The results indicate that the control technique combining ESC and feedforward control performed as well or better than the ESC or feedforward control over the entire simulation. The combined technique was particularly effective between 10,000 seconds and 20,000 seconds. During this period, the ESC filters were being initialized and the mean value of the manipulated variable was held constant by the ESC. The same initialization occurred in the combined control technique. However, the performance of the combined control technique was better during this period due to the feedforward control.

It should be noted that the feedforward control and the ESC perform well individually in the simulation case considered. However, each had limitations, i.e., sensitivity to modeling and sensor error for the feedforward control and convergence speed for the ESC. The advantage of the disclosure herein complements one control strategy with the strength of the other.

Chilled Water Plant 1100

Figure 11A:
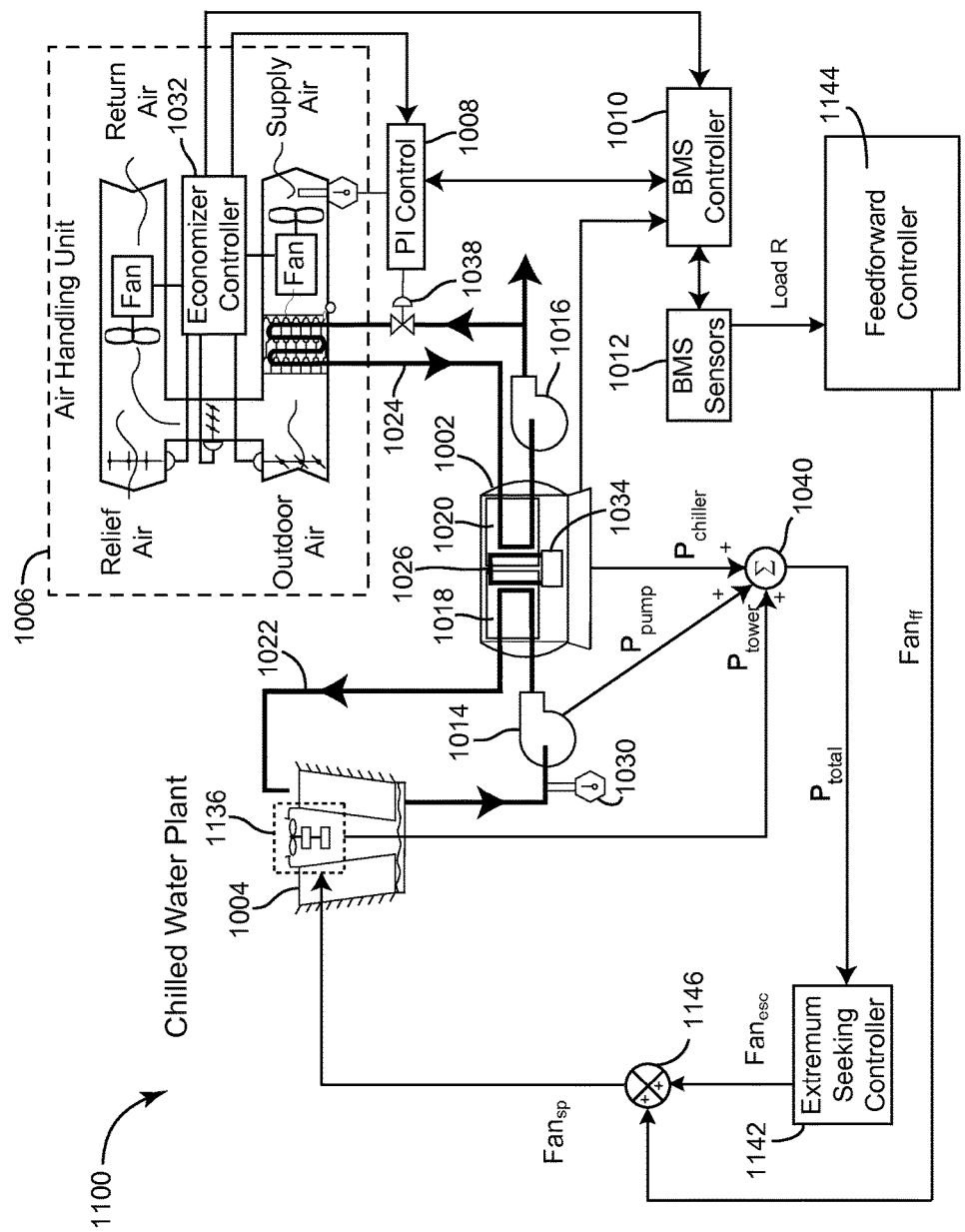
FIG. 11A is a block diagram of a chilled water plant in which the systems and methods of the present disclosure can be implemented to control the fan speed for a cooling tower fan system in the plant, according to some embodiments.

Referring now to FIG. 11A, another chilled water plant 1100 is shown, according to some embodiments. Chilled water plant 1100 can include some or all of the components of chilled water plant 1000, as described with reference to FIG. 10A. Different from FIG. 10A, the fan speed $Fan_{sp}$ of cooling tower fan system 1136 is used herein as the control input to optimize the total power consumption $P_{total}$ for any give load R on the chilled water plant 1100.

The Feedforward controller 1144 is shown to receive an indication of load R on the chilled water plant 1100 from a component (e.g., a load sensor) of BMS sensors 1012. In some embodiments, BMS controller 1010 collects the information provided by the BMS sensors 1012 and provides the load R on the chilled water plant 1100 to feedforward controller 1144. Feedforward controller 1144 creates a feedforward contribution $Fan_{ff}$ to the fan speed $Fan_{sp}$ of cooling tower fan system 1136 in chilled water plant 1100. In some embodiments, feedforward controller 1144 includes a feedforward model or lookup table that maps the load R to the feedforward contribution $Fan_{ff}$.

Extremum seeking controller 1142 provides an ESC contribution $Fan_{esc}$ to the fan speed $Fan_{sp}$. The fan speed element 1146 combines the ESC contribution $Fan_{esc}$ output from extremum seeking controller 1142 and the feedforward contribution $Fan_{ff}$ output from feedforward controller 1144 to produce the fan speed $Fan_{sp}$. The fan speed element 1146 provides the fan speed $Fan_{sp}$ to the cooling tower fan system 1136. In some embodiments, the fan speed $Fan_{sp}$ is the manipulated variable which extremum seeking controller 1142 adjusts to affect the total system power $P_{total}$. In some embodiments, the variable speed drive electronics of the cooling tower fan system 1136 can control the fan to achieve the fan speed $Fan_{sp}$ accordingly.

Extremum seeking controller 1142 implements an extremum seeking control strategy that dynamically searches for an unknown input (e.g., optimal fan speed $Fan_{sp}$) to obtain system performance (e.g., total power consumption $P_{total}$) that trends near optimal.

Figures 11B, 11C:
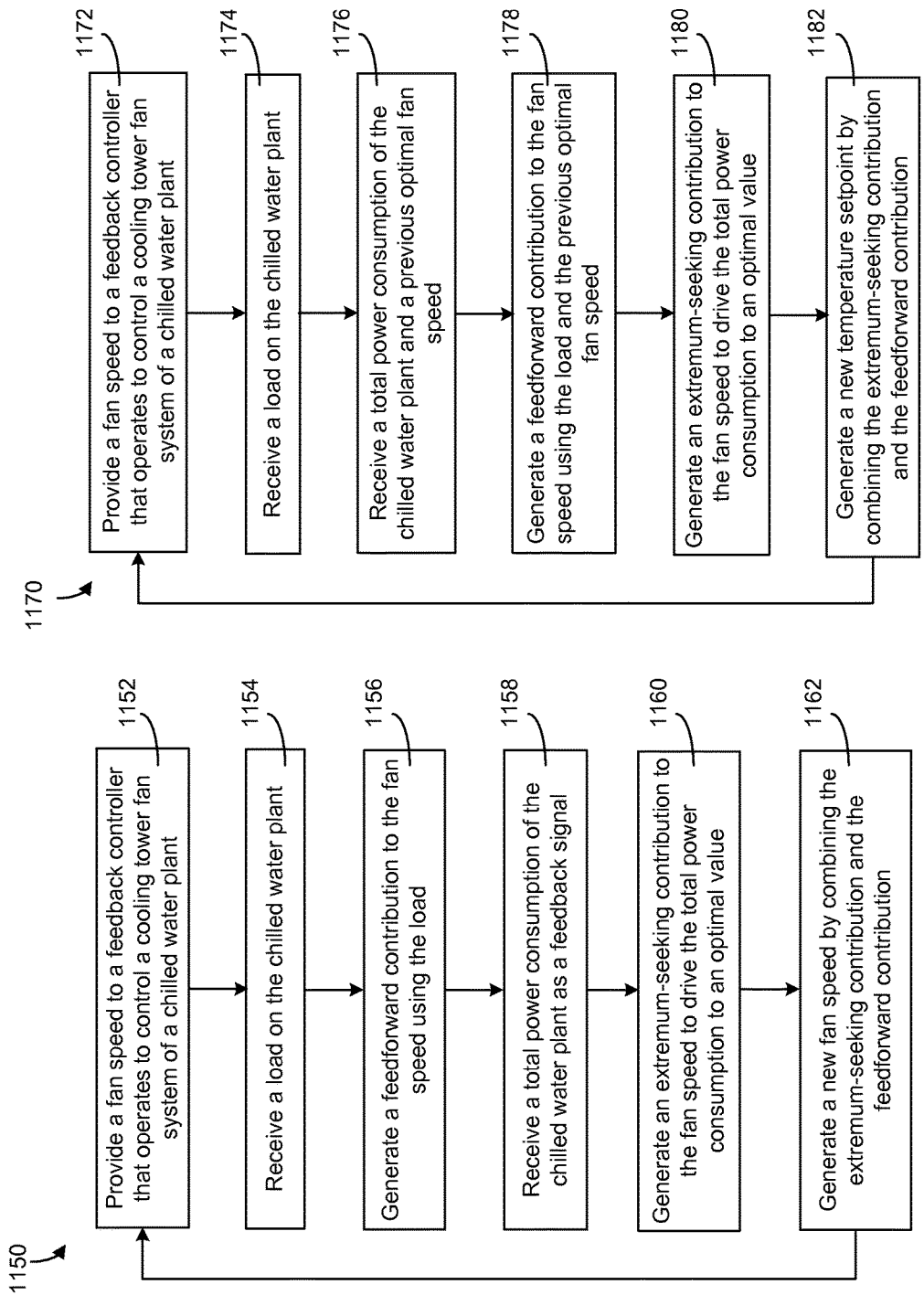
FIG. 11B is a flow diagram illustrating a control method combining ESC and feedforward control used in the chilled water plant of FIG. 11A, according to some embodiments.
FIG. 11C is a flow diagram illustrating another control method combining ESC and feedforward control used in the chilled water plant of FIG. 11A, according to some embodiments.

Referring now to FIGS. 11B and 11C, a pair of flow diagrams 1150 and 1170 illustrating the operation of fan speed control in chilled water plant 1100 are shown, according to some embodiments. In both flow diagrams 1150 and 1170, a load R is provided to feedforward controller 1144, a fan speed $Fan_{sp}$ for cooling tower fan system 1136 is provided to a cooling tower fan system 1136. The variable speed drive electronics of the cooling tower fan system 1136 can control the fan to achieve the fan speed $Fan_{sp}$ accordingly. Extremum seeking controller 1142 can receive a total power consumption $P_{total}$ of the chilled water plant 1100 as a feedback signal. In some embodiments, feedforward controller 1144 uses a previous optimum fan speed $Fan_{sp0}$ to correct its output.

In flow diagram 1150, a fan speed $Fan_{sp}$ is provided to cooling tower fan system 1136 that operates to control the actual fan speed $Fan_{actual}$ of cooling tower fan system 1136 (block 1152). Feedforward controller 1144 receives a load R (block 1154) and generates a feedforward contribution $Fan_{ff}$ to the fan speed $Fan_{sp}$ using load R (block 1156). Extremum-seeking controller 1142 receives the total power consumption P total of chilled water plant 1100 as a feedback signal (block 1158) and generates an extremum-seeking contribution $Fan_{esc}$ to the fan speed $Fan_{sp}$ to drive the total power consumption P total to an optimal value (block 1160). Fan speed element 1146 generates a fan speed by combining the extremum-seeking contribution $Fan_{esc}$ and the feedforward contribution $Fan_{ff}$ (block 1162). The new fan speed can be provided to cooling tower fan system 1136.

In flow diagram 1170, a fan speed $Fan_{sp}$ is provided to cooling tower fan system 1136 that operates to control the actual fan speed $Fan_{actual}$ of cooling tower fan system 1136 (block 1172). Feedforward controller 1144 receives a load R (block 1174). Feedforward controller 1144 receives a previous optimal fan speed $Fan_{sp0}$ from chilled water plant 1100 and extremum-seeking controller 1142 receives a total power consumption P total of chilled water plant 1100 as a feedback signal (block 1176). Feedforward controller 1144 generates a feedforward contribution $Fan_{ff}$ to the fan speed $Fan_{sp}$ using the previous optimal fan speed $Fan_{sp0}$ and the load R (block 1178). Extremum-seeking controller 1142 generates an extremum-seeking contribution $Fan_{esc}$ to the fan speed $Fan_{sp}$ to drive the total power consumption P total to an optimal value (block 1180). Fan speed element 1146 generates a new fan speed by combining the extremum-seeking contribution $Fan_{esc}$ and the feedforward contribution $Fan_{ff}$ (block 1182). The new fan speed can be provided to cooling tower fan system 1136.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system configured to operate a plant to achieve an optimal value for a performance variable of the plant, the control system comprising:
   a feedforward controller configured to receive a measurable disturbance to the plant and generate a feedforward contribution to a control input to the plant using the measurable disturbance;
   an extremum-seeking controller configured to receive the performance variable from the plant and generate an extremum-seeking contribution to the control input to drive the performance variable to the optimal value; and
   a control input element configured to generate the control input by combining the extremum-seeking contribution and the feedforward contribution and provide the control input to the plant, wherein the plant uses the control input to operate equipment of the plant, thereby driving the performance value to the optimal value,
   wherein the feedforward controller generates the feedforward contribution without requiring knowledge of the extremum-seeking contribution.

2. The control system of claim 1, wherein the feedforward controller is configured to generate the feedforward contribution based on a lookup table that maps the measurable disturbance to the control input.

3. The control system of claim 1, wherein the feedforward controller is configured to generate the feedforward contribution based on a feedforward model that maps the measurable disturbance to the control input.

4. The control system of claim 3, wherein the feedforward model is established based on data collected during tests and/or actual applications.

5. The control system of claim 1, wherein the feedforward controller is further configured to:
   receive a previous optimal control input that corresponds to a previous optimal value for the performance variable under a previous measurable disturbance; and
   correct the feedforward contribution using the previous optimal control input.

6. The control system of claim 1, wherein the extremum-seeking controller is further configured to:
   perturb the control input with a periodic signal;
   monitor the performance variable from the perturbed control input;
   estimate a gradient of the performance variable with respect to the control input; and
   modulate the extremum-seeking contribution to drive the estimated gradient to zero.

7. The control system of claim 1, wherein the extremum-seeking controller is further configured to:
   perturb the control input with a stochastic excitation signal;
   monitor the performance variable from the perturbed control input;
   estimate a gradient of the performance variable with respect to the control input; and
   modulate the extremum-seeking contribution to drive the estimated gradient to zero.

8. The control system of claim 7, wherein the stochastic excitation signal is a non-periodic signal comprising at least one of a random walk signal, a non-deterministic signal, and a non-repeating signal.

9. A control system configured to operate equipment of a chilled water plant to achieve an optimal value for a total power consumption of the chilled water plant, the equipment comprising at least one of a chiller compressor, a condenser water pump, and a cooling tower fan; the control system comprising:
   a feedforward controller configured to receive an ambient temperature and generate a feedforward contribution to a temperature setpoint for condenser water temperature in the chilled water plant using the ambient temperature;
   an extremum-seeking controller configured to receive the total power consumption from the plant and generate an extremum-seeking contribution to the temperature setpoint to drive the total power consumption to the optimal value; and
   a control input element configured to generate the temperature setpoint by combining the extremum-seeking contribution and the feedforward contribution and provide the temperature setpoint to the chilled water plant, wherein the chilled water plant uses the temperature setpoint to operate the equipment of the chilled water plant, thereby driving the total power consumption to the optimal value,
   wherein the feedforward controller generates the feedforward contribution without requiring knowledge of the extremum-seeking contribution.

10. The control system of claim 9, wherein the feedforward controller is configured to generate the feedforward contribution based on a lookup table that maps the ambient temperature to the temperature setpoint.

11. The control system of claim 9, wherein the feedforward controller is configured to generate the feedforward contribution based on a feedforward model that maps the ambient temperature to the temperature setpoint.

12. The control system of claim 11, wherein the feedforward model is established based on data collected during tests and/or actual applications.

13. The control system of claim 9, wherein the feedforward controller is further configured to:
receive a previous optimal temperature setpoint that corresponds to a previous optimal value for the total power consumption under a previous ambient temperature; and
correct the feedforward contribution using the previous optimal temperature setpoint.

14. The control system of claim 9, wherein the extremum-seeking controller is further configured to:
perturb the temperature setpoint with a stochastic signal;
monitor the total power consumption from the perturbed temperature setpoint;
estimate a gradient of the total power consumption with respect to the temperature setpoint; and
modulate the extremum-seeking contribution to drive the estimated gradient to zero.

15. A control system configured to operate equipment of a chilled water plant to achieve an optimal value for a total power consumption of the chilled water plant, the equipment comprising at least one of a chiller compressor, a condenser water pump, and a cooling tower fan; the control system comprising:
a feedforward controller configured to receive a load on the chilled water plant and generate a feedforward contribution to a fan speed for the cooling tower fan using the load;
an extremum-seeking controller configured to receive the total power consumption from the plant and generate an extremum-seeking contribution to the fan speed to drive the total power consumption to the optimal value; and
a control input element configured to generate the fan speed by combining the extremum-seeking contribution and the feedforward contribution and provide the fan speed to the chilled water plant, wherein the chilled water plant uses the fan speed to operate the cooling tower fan, thereby driving the total power consumption to the optimal value,
wherein the feedforward controller generates the feedforward contribution without requiring knowledge of the extremum-seeking contribution.

16. The control system of claim 15, wherein the feedforward controller is configured to generate the feedforward contribution based on a lookup table that maps the load to the fan speed.

17. The control system of claim 15, wherein the feedforward controller is configured to generate the feedforward contribution based on a feedforward model that maps the load to the fan speed.

18. The control system of claim 17, wherein the feedforward model is established based on data collected during tests and/or actual applications.

19. The control system of claim 15, wherein the feedforward controller is further configured to:
receive a previous optimal fan speed that corresponds to a previous optimal value for the total power consumption under a previous load; and
correct the feedforward contribution using the previous optimal fan speed.

20. The control system of claim 15, wherein the extremum-seeking controller is further configured to:
perturb the fan speed with a stochastic signal;
monitor the total power consumption from the perturbed fan speed;
estimate a gradient of the total power consumption with respect to the fan speed; and
modulate the extremum-seeking contribution to drive the estimated gradient to zero.

* * * * *